US005812153A

United States Patent [19]

Watanabe et al.

[11] Patent Number: 5,812,153

[45] Date of Patent: Sep. 22, 1998

[54] INK JET PRINTING APPARATUS CAPABLE OF SIMULTANEOUSLY PRINTING AN IMAGE ON BOTH SIDES OF PRINTING SHEET

[75] Inventors: Takeshi Watanabe; Kikunosuke Tsuji; Setsuo Hori; Seiji Kado; Kenichi Satake; Hiromi Nakatsu; Kohichi Baba; Masayuki Ishii; Yoshiko Uriu, all of Osaka, Japan

[73] Assignee: Mita Industrial Co., Ltd., Osaka, Japan

[21] Appl. No.: 440,596

[22] Filed: May 15, 1995

[30] Foreign Application Priority Data

May 26, 1994 [JP] Japan .................................... 6-112522

[51] Int. Cl.[6] .............................. B41J 2/00; H04N 1/034

[52] U.S. Cl. ..................................................... 347/3; 347/5

[58] Field of Search .................................... 347/5, 104, 3, 347/42, 8; 399/306, 364, 303, 313; 400/82, 188, 635; 271/198, 275, 272

[56] References Cited

U.S. PATENT DOCUMENTS

| | | | |
|---|---|---|---|
| 2,801,727 | 8/1957 | Malnati . | |
| 3,198,516 | 8/1965 | Withorn et al. . | |
| 3,653,509 | 4/1972 | Goodman, Jr. et al. | 209/540 |
| 3,947,020 | 3/1976 | Kobayashi | 271/283 |
| 4,475,128 | 10/1984 | Koumura | 347/3 |
| 4,886,967 | 12/1989 | Itakura | 250/589 |
| 5,065,169 | 11/1991 | Vincent et al. | 347/8 |
| 5,178,383 | 1/1993 | Moser et al. | 271/299 |
| 5,231,423 | 7/1993 | Wataya et al. | 347/42 |
| 5,265,867 | 11/1993 | Magee | 271/272 |
| 5,376,957 | 12/1994 | Gandy et al. | 347/3 |
| 5,407,191 | 4/1995 | Ukai | 271/272 |
| 5,615,877 | 4/1997 | Watanabe et al. | 347/104 |

FOREIGN PATENT DOCUMENTS

| | | |
|---|---|---|
| 61-174040 | 8/1986 | Japan . |
| 252817 | 2/1990 | Japan . |
| 5185661 | 7/1993 | Japan . |
| 5330037 | 12/1993 | Japan . |

*Primary Examiner*—N. Le
*Assistant Examiner*—L. Anderson
*Attorney, Agent, or Firm*—Jordan and Hamburg

[57] ABSTRACT

An ink jet printing apparatus includes a sheet transporting mechanism for transporting a printing sheet along a vertical plane; a first printing head unit provided on a horizontal plane perpendicularly intersecting the vertical plane and having an ink emission portion for emitting ink to one side surface of the printing sheet; and a second printing head unit provided on a horizontal plane perpendicularly intersecting the vertical plane and having an ink emission portion for emitting ink to the other side surface of the printing sheet.

15 Claims, 22 Drawing Sheets

P
5b
52b
51b
422a
422
44
95
91
102
90
90a
38
81
43
85
42
51a
421a
423
421
424
425
101
10
80
804
Y
M
C
BK
11
52a
421c
81b
A3
A4
421b
12
421d
801
802
803

INK JET PRINTING APPARATUS CAPABLE OF SIMULTANEOUSLY PRINTING AN IMAGE ON BOTH SIDES OF PRINTING SHEET

BACKGROUND OF THE INVENTION

This invention relates to an ink jet printing apparatus for use with facsimile machine, copying machine, printer, computer output device, and the like, and more particularly to an ink jet printing apparatus capable of simultaneously printing an image on both sides of a printing sheet.

Conventionally, various types of printing apparatus using ink jet emission have been marketed in which ink is emitted from nozzles of an ink emission portion to print an image or letter on a surface of a printing sheet. Recently, further, there has been proposed an ink jet printing apparatus which can print an image on both sides of a printing sheet.

For example, Japanese Unexamined Patent Publication No. 5-185661 discloses an ink jet printing apparatus including a first ink emission portion for printing an image on the front side of a printing sheet and a second ink emission portion for printing another image on the back side of the sheet which are arranged along a horizontal plane. In this known apparatus, the printing sheet is transported along the horizontal plane by wide transporting belts having a width greater than the width of printing sheet.

Also, Japanese Unexamined Patent Publication No. 5-330037 discloses an ink jet printing apparatus in which ink emission portions are vertically arranged and opposed to each other with respect to a horizontal plane along which a printing sheet is transported. The opposite ink emission portions print images on both sides of a horizontally transported printing sheet.

In these known apparatuses, however, a printing sheet is transported or moved along a horizontal plane. Accordingly, the printing sheet must be supported by belts or rollers entirely extending in a direction of width of the printing sheet to prevent flexure of the printing sheet by the weight. This has caused the problem that printed fresh images are liable to be damaged by the belt or roller and ink of printed fresh images is liable to smear the belt or roller due to the fact that the printing sheet is transferred to such wide transporting belt or roller from the printing portion before the ink completely dries out.

Also, in these known apparatuses, the sheet transportation mechanism is constructed by belts or rollers arranged in a horizontal direction, which consequently increases the size of apparatus. Further, to enable printing on a wide printing sheet, the transporting belt and roller are required to be made as wide as possible. These are obstructive for the demand of down-sizing or reducing the size of apparatus.

Further, in these known apparatus, one of the ink emission portions for printing both sides of a printing sheet faces downward while the other faces upwards. Accordingly, their ink emission pressures are different from each other because one emits ink following the gravity while the other emits ink against the gravity. This has caused a difference in image density between the two sides of the sheet. Alternatively, this has needed a special device for artificially adjusting the ink emission pressures of the two emission portions to eliminate the image density difference, which made the apparatus construction more complicated and increased the production costs.

SUMMARY OF THE INVENTION

It is an object of the present invention to provide an ink jet printing apparatus which has overcome the problems residing in the prior art.

It is another object of the present invention to provide an ink jet printing apparatus which has a reduced size and is simpler in construction.

An ink jet printing apparatus of the present invention comprising: a sheet transporting mechanism for transporting a printing sheet along a vertical plane; a first printing head unit provided on a horizontal plane perpendicularly intersecting the vertical plane and having an ink emission portion for emitting ink to one side surface of the printing sheet; and a second printing head unit provided on a horizontal plane perpendicularly intersecting the vertical plane and having an ink emission portion for emitting ink to the other side surface of the printing sheet.

The first and second printing head units may be provided on the same horizontal plane. The ink jet printing apparatus may be further provided with a moving mechanism for moving the first and second printing head units from a first state where they are away from each other to a second state where they are close to each other, and vice versa.

Further, the first and second printing head units may be provided with a capping portion for enclosing the ink emission portion of the opposite printing head unit when they are in the second state.

The length of the ink emission portion may be made equal to or more than a width of the printing sheet. Also, it may be appreciated that the length of the ink emission portion is made smaller than a width of the printing sheet, and the first and second printing head units are moved in width directions of the printing sheet so that the ink emission portion covers an entire width of the printing sheet.

It may be preferable to provide the first and second printing head unit with a spacing member for keeping a constant space between the ink emission portion and the surface of the printing sheet. The spacing member may be a roller rotatably attached to the printing head unit.

The sheet transporting mechanism may be constructed by a first pair of endless belts for holding one side end of the printing sheet, the endless belts being rotatable in a vertical direction: a second pair of endless belts for holding the other side end of the printing sheet, the endless belts being rotatable in the same vertical direction as the first pair of endless belts: and a driver for rotating the first and second pairs of endless belts in synchronism with each other. Further, the sheet transporting mechanism may be provided with a belt moving mechanism for moving the first and second pairs of endless belts away from each other or close to each other in accordance with a width of the printing sheet.

With the ink jet printing apparatus, the printing sheet is transported in a vertical direction. Accordingly, there is not the necessity of providing wide support belts or rollers to keep the printing sheet from bending or warping by the weight. This will ensure a smaller sized apparatus.

Further, comparing to the conventional apparatus having the printing head units arranged in a vertical direction, the present apparatus having the printing head units arranged in a horizontal direction will ensure the same ink emission on both sides of a printing sheet, and thus prevent an image density difference from occurring.

Also, the first and second printing head units are provided on the same horizontal plane, and moved away from or close to each other, and further provided with a capping portion for enclosing the ink emission portion of the opposite printing head unit. Accordingly, the ink emission portions can be assuredly enclosed in a simplified construction.

Further, in the case that the printing head units are moved in widthwise directions of the sheet to cover the entire width of the sheet, the movement range of the printing head units is changed in accordance with the size of printing sheet. Accordingly, both-side printing can be applied for printing sheets of various sizes.

The spacing member provided in the printing head unit will ensure a constant space between the ink emission portion and the surface of the printing sheet.

The first and second pairs of endless belts, which are provided on side ends of the printing sheet, will assuredly transport the printing sheet without coming into contact with image printing area of the printing sheet. Also, the first and second pairs of endless belts are moved away from or close to each other in accordance with the width of the printing sheet. This will enable both-side printing for various size printing sheets.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
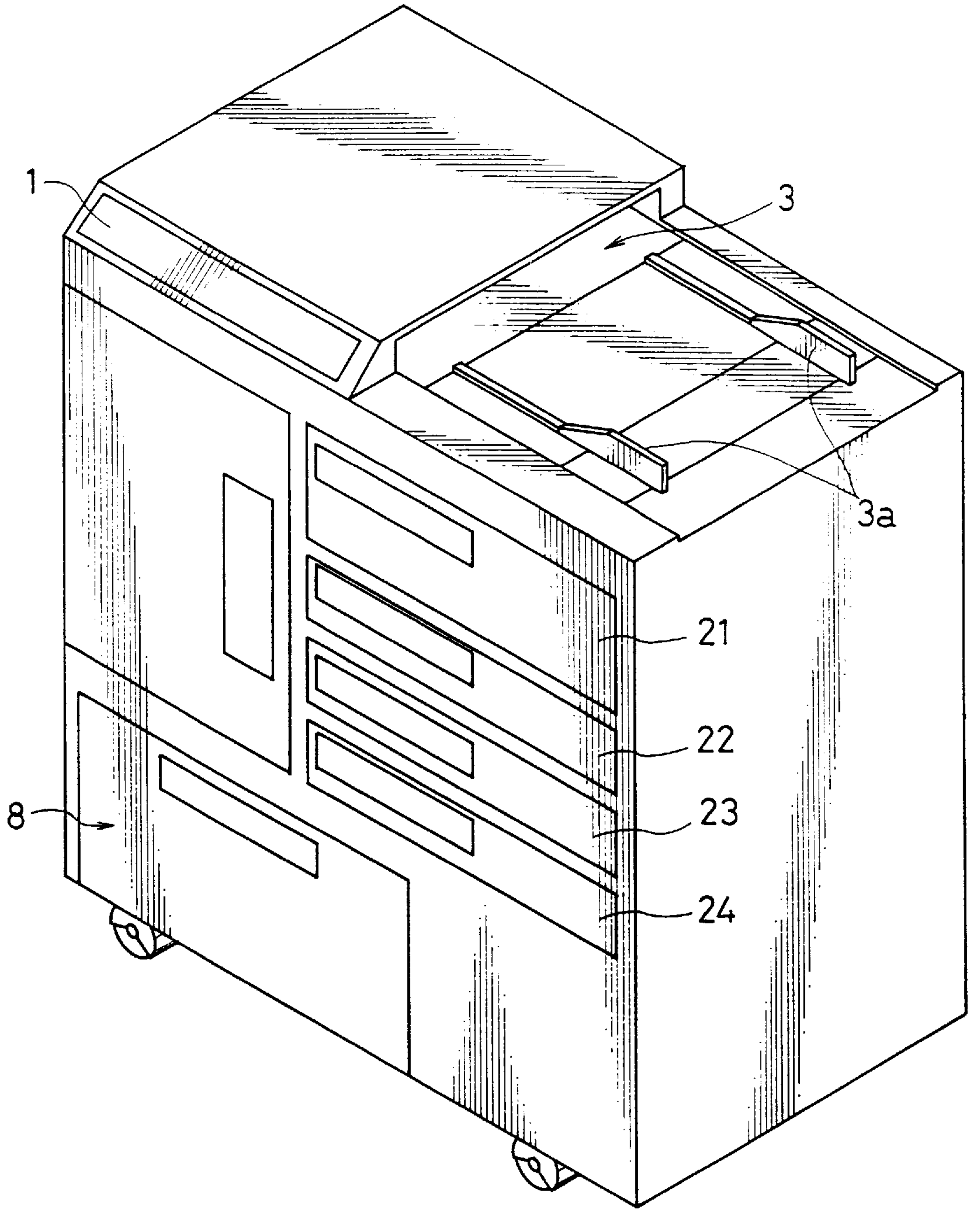
FIG. 1 is a perspective view showing an external appearance of an ink jet printing apparatus embodying the invention.
Figure 2B:
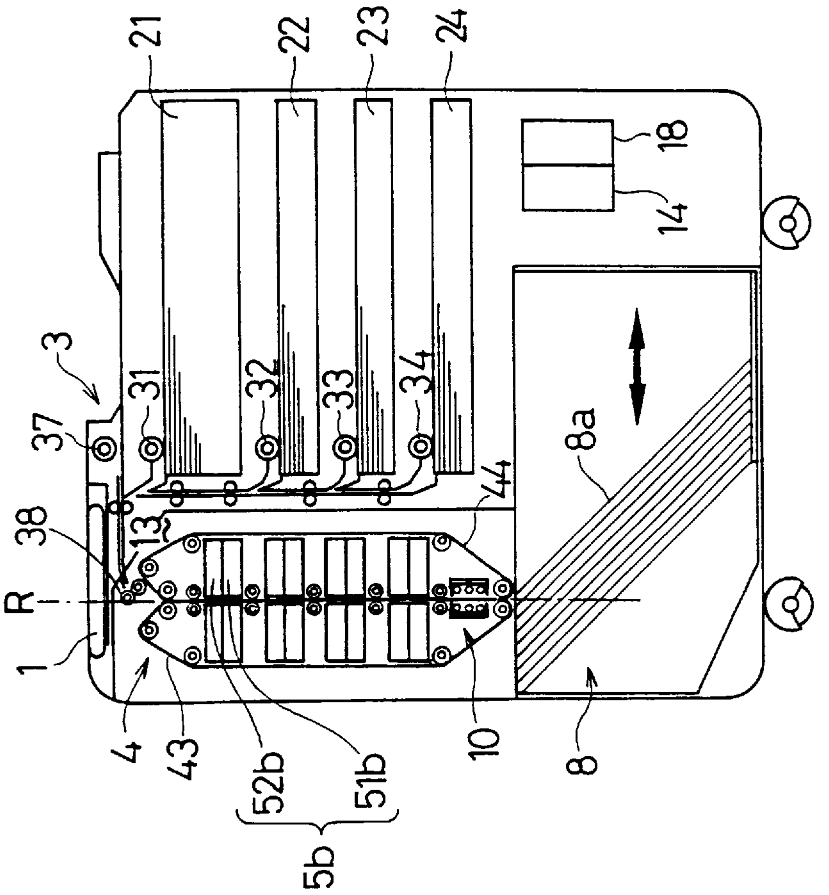
FIG. 2B is a schematic front sectional view showing the internal arrangement of the ink jet printing apparatus.
Figure 2A:
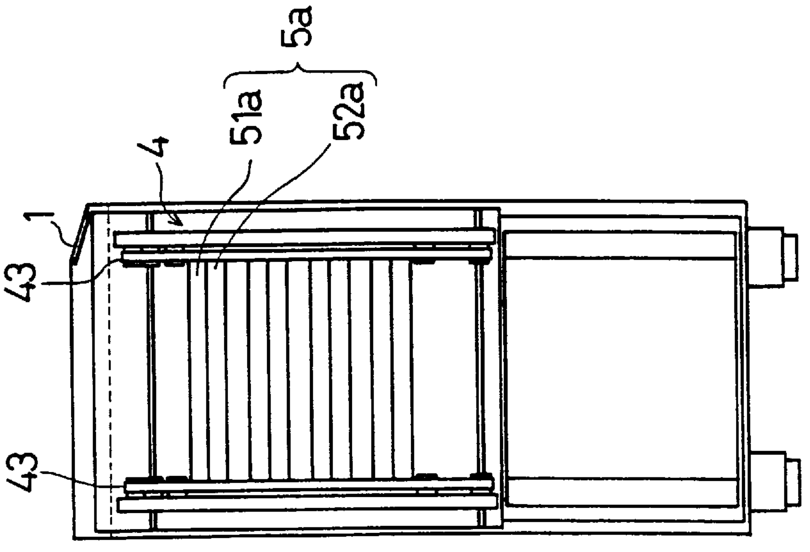
FIG. 2A is a schematic left side sectional view showing an internal arrangement of the ink jet printing apparatus.

An ink jet printing apparatus embodying the present invention will be described with reference to FIGS. 1 to 15. FIG. 1 is a perspective view showing an external appearance of the ink jet printing apparatus. FIGS. 2A and 2B are schematic diagrams showing an internal arrangement of the ink jet printing apparatus: FIG. 2A showing a left side elevation view; and FIG. 2B showing a front elevation view.

It should be appreciated that a direction from right to left or left to right in FIG. 2A is referred to as “a widthwise direction of the apparatus”, and a direction from right to left or left to right in FIG. 2B is referred to as “a lengthwise direction of the apparatus”.

The ink jet printing apparatus is connected with an unillustrated image generator such as personal computers to print an image generated in the image generator on a printing sheet P.

Referring to FIG. 2B, the ink jet printing apparatus includes a printing sheet storage portion in a right side thereof, a printing portion 4 in a left side, and a printing sheet transport assembly 13 between the printing sheet storage portion and the printing portion 4.

The printing sheet storage portion includes a plurality of cassettes 21 to 24 for storing different sized printing sheets respectively. The printing sheet transport assembly 13 transports a printing sheet P dispensed from one of the cassettes 21 to 24 in the printing sheet storage portion to the printing portion 4 where an image is printed on one side of the printing sheet P or on both sides of the printing sheet P.

The ink jet printing apparatus is further provided with a sorter 8 below the printing portion 4. The sorter 8 includes a plurality of bin trays 8*a* stacked horizontally one over another by a specified distance. Driven by an unillustrated spiral cam, the bin trays 8*a* are moved one by one to sort out printing sheets having printed images. The ink jet printing apparatus is further provided with an operation panel 1 and a printing sheet bypass portion 3 at an appropriate position on a top thereof.

Figure 8:
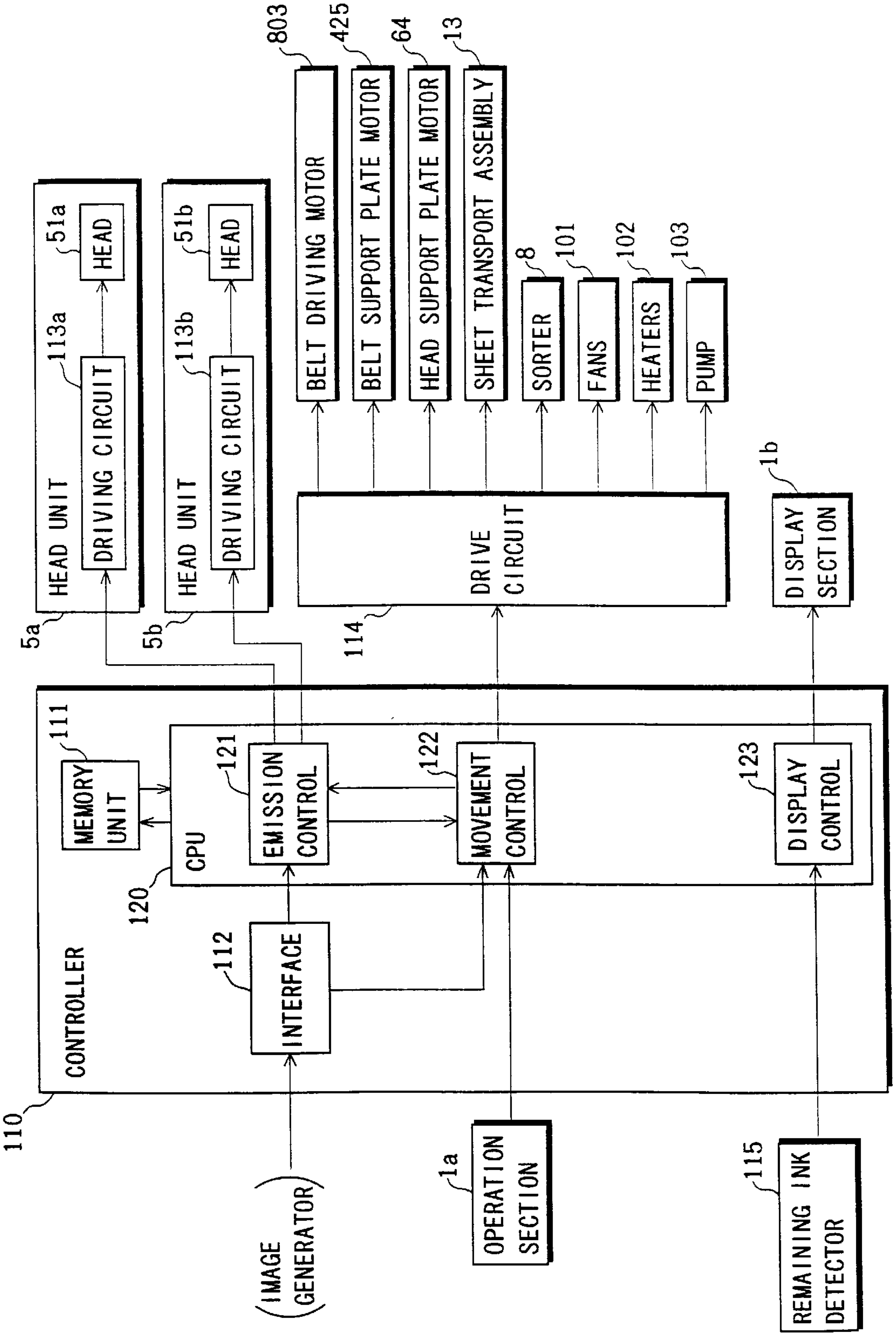
FIG. 8 is a block diagram showing a control system of the ink jet printing apparatus.

The operation panel 1 includes an operation section 1*a* and a display section 1*b* as shown in FIG. 8. The operation section 1*a* is arranged with various key portions including printing sheet size designation keys for use in a manual operation when an operator manually selects a size of printing sheet, and a pressure stabilizing key for activating pressure stabilization of ink to be emitted. The display section 1*b* is made of an LCD (Liquid Crystal Display) or an LED (Light Emitting Diode) and adapted for displaying contents of printing instructions.

The printing sheet bypass portion 3 includes a sheet alignment mechanism 3*a*. When manually supplying a printing sheet or a stack of printing sheets, insertion position of printing sheet is defined by the sheet alignment mechanism 3*a*.

The plurality of cassettes 21 to 24 are arranged one over another. In this embodiment, for example, the cassette 21 contains printing sheets of A4 size with the longer side thereof in parallel with the lengthwise direction of the apparatus; the cassette 22 contains printing sheets of A3 size with the longer side thereof in parallel with the lengthwise direction of the apparatus; the cassette 23 contains printing sheets of B4 size with the longer side thereof in parallel with the lengthwise direction of the apparatus; and the cassette 24 contains printing sheets of B5 size with the longer side thereof in parallel with the widthwise direction of the apparatus.

It may be possible to place printing sheets of a size other than the above-mentioned sizes in the cassette, and place the longer side of printing sheets in parallel with the widthwise direction of the apparatus instead of with the lengthwise direction.

The printing sheet transport assembly 13 comprises feed rollers 31 to 34, and 37, transport roller pairs, and a pair of registration rollers 38. The feed rollers 31 to 34 are adapted for dispensing printing sheets from the corresponding cassettes 21 to 24 one by one, and the feed roller 37 feeds a printing sheet being inserted manually through the printing sheet bypass portion 3. A printing sheet P dispensed from the cassettes 21 to 24 or fed through the printing sheet bypass portion 3 is transported downstream by the corresponding transport roller pair.

The printing sheet P is temporarily nipped between a drive roller and a driven roller of the registration roller pair 38. After a skew transport of the printing sheet P is corrected, if any, the drive roller of the registration roller pair 38 starts rotating in a forward direction to transport the printing sheet P in timed relation with ink jet operation to the printing portion 4. Namely, after a predetermined time period is counted after the driving of the registration roller pair 38, an ink jet operation is started.

The printing portion 4 includes a printing sheet transport mechanism, a printing mechanism, and a dryer. The printing sheet transport mechanism includes a pair of front and rear driving transport belts 43 and a pair of front and rear driven transport belts 44. The driving transport belt pair 43 is located on a left side of the printing portion 4, and the driven transport belt pair 44 is located on a right side thereof. The printing mechanism includes on the left side of the printing portion 4 four printing head units 5*a*, and on the right side four printing head units 5*b*. The four printing head units 5*a* are arranged vertically one over another by a specified distance on the left side, while the four printing head units 5*b* are arranged vertically one over another by a specified distance on the right side.

The rear driving transport belt 43 is stretched vertically around a rear end of the printing head unit 5*a*. and the front driving transport belt 43 is stretched vertically around a front end of the printing head unit 5*a*. The rear driven transport belt 44 is stretched vertically around a rear end of the printing head unit 5*b*, and the front driven transport belt 44 is stretched vertically around a front end of the printing head unit 5*b*. The rear driving transport belt 43 and the rear driven transport belt 44 correspond to each other, while the front driving transport belt 43 and the front driven transport belt 44 correspond to each other.

A printing sheet P transported in the printing portion 4 is transported downward in a vertical direction, i.e., in a sheet transport path represented by the phantom line R in FIG. 2B with its front and rear ends of the printing sheet P nipped between the front driving transport belt 43 and the front driven transport belt 44 and between the rear driving transport belt 43 and the rear driven transport belt 44, respectively.

Each printing head unit 5*a* is opposed to each printing head unit 5*b* on a horizontal plane. The printing sheet P is transported downward through the printing portion 4, with one side facing the printing head units 5*a* and the other side facing the printing head units 5*b* along a sheet transport path defined by the driving and driven transport belt pairs 43, 44.

Figure 3B:
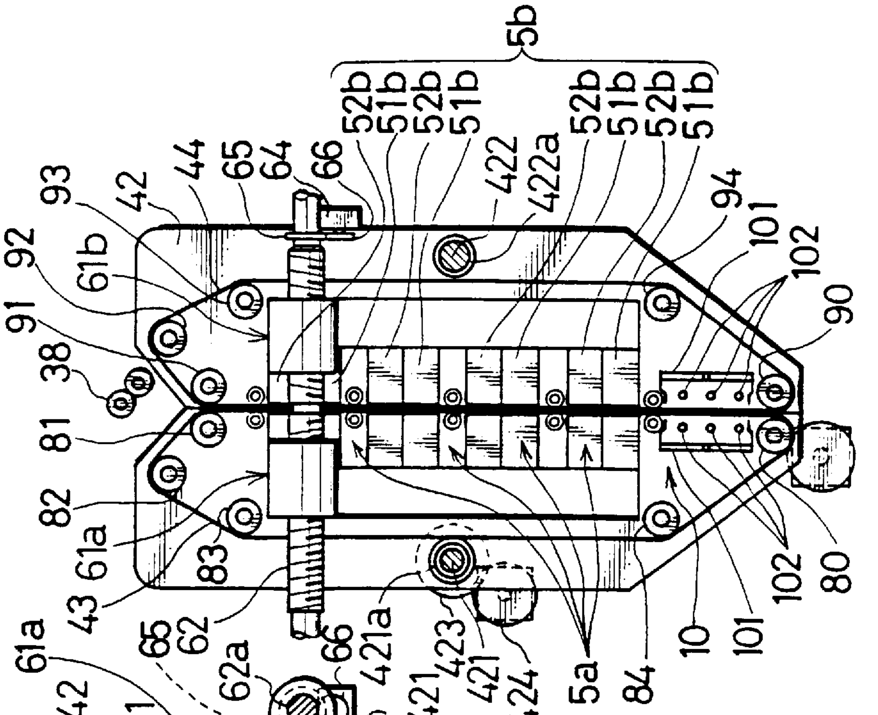
FIG. 3B is a front view showing the printing portion.
Figure 3A:
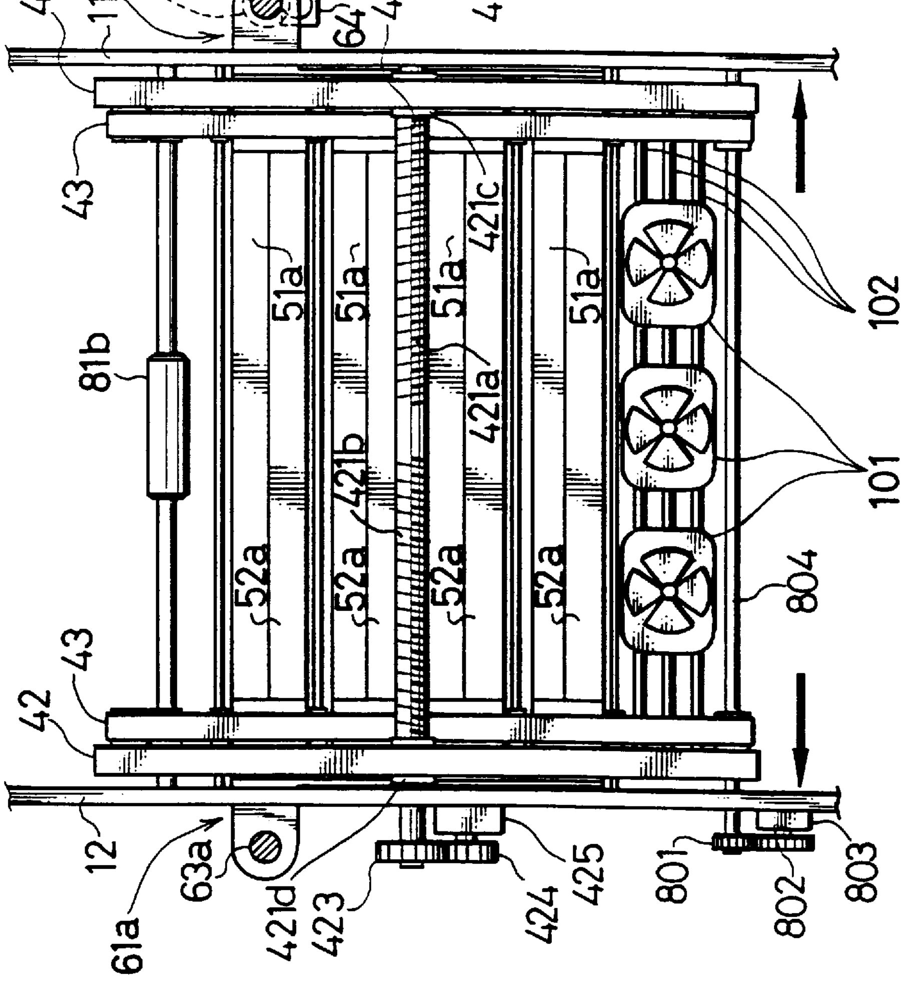
FIG. 3A is a left side view showing a printing portion of the ink jet printing apparatus.
Figures 4A, 4B:
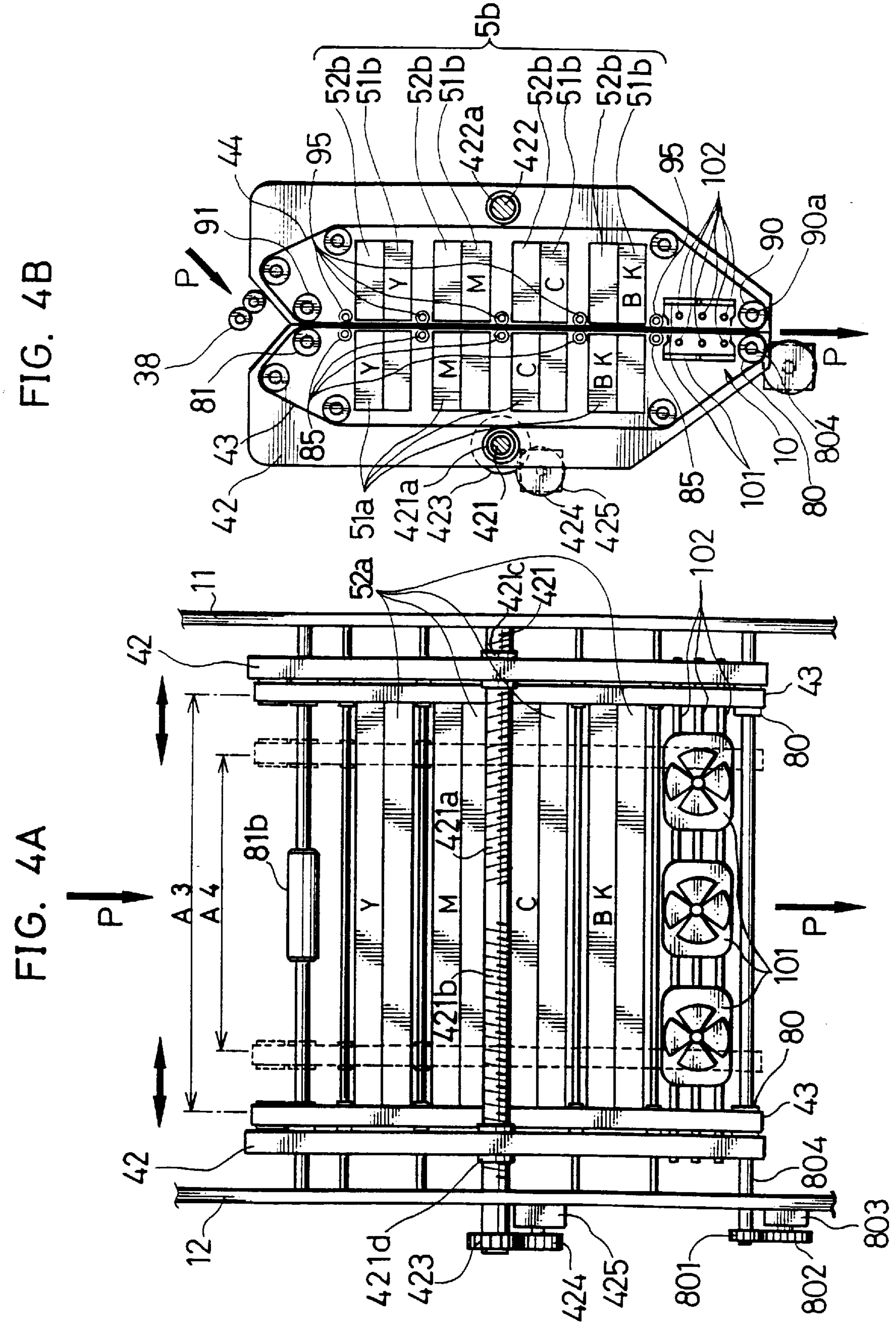
FIG. 4A is a left side view showing the printing portion with a printing head unit moving mechanism omitted.
FIG. 4B is a front view showing the printing portion with the printing head unit moving mechanism omitted.
Figure 5B:
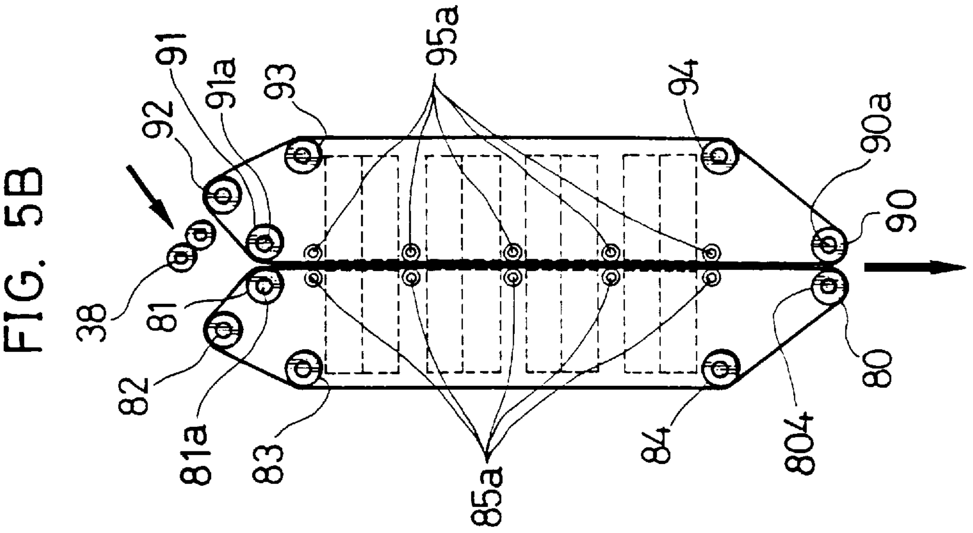
FIG. 5B is a front view showing the printing sheet transport mechanism.
Figure 5A:
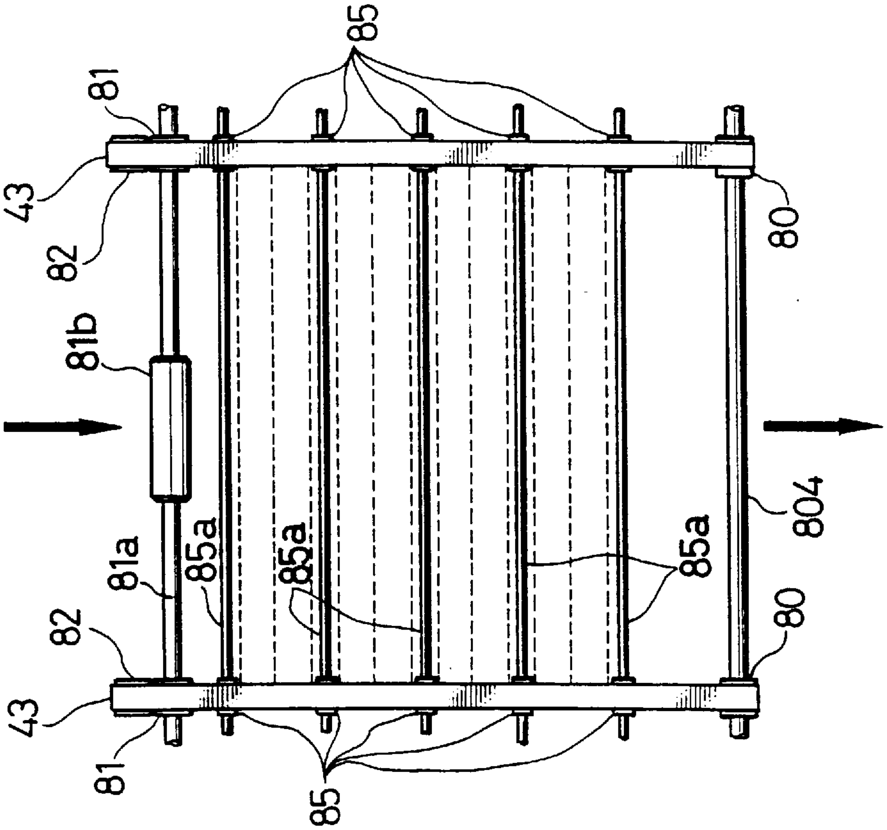
FIG. 5A is a left side view showing a printing sheet transport mechanism of the printing portion.
Figure 6:
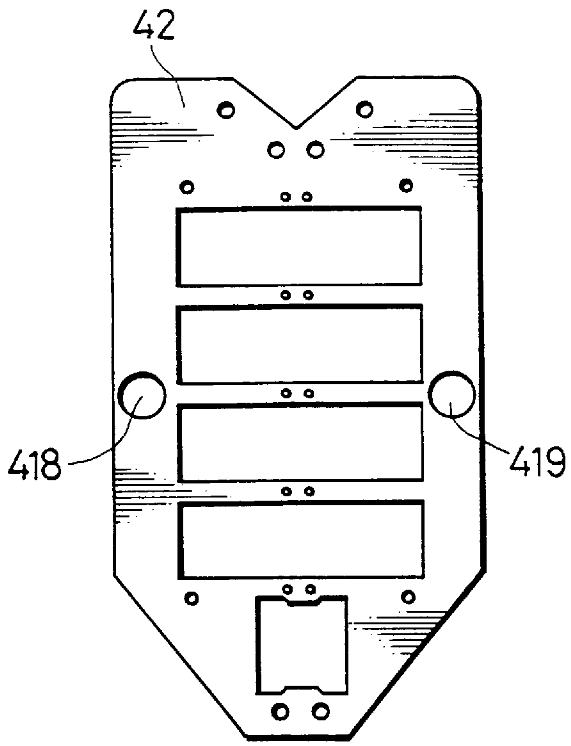
FIG. 6 is a front view showing a movable support plate.

The printing sheet transport mechanism will be described in more detail with reference to FIGS. 3A to 5B. FIGS. 3A and 3B are diagrams showing an arrangement in the printing portion 4; FIG. 3A being a left side elevation view; FIG. 3B being a front elevation view. FIGS. 4A and 4B are diagrams each corresponding to FIGS. 3A and 3B and showing the arrangement in the printing portion 4 with a printing head unit moving mechanism omitted. FIG. 5 is a diagram showing the printing sheet transport mechanism: FIG. 5A being a left side elevation view; FIG. 5B being a front elevation view.

It should be noted that in FIGS. 3A, 4A, and 5A, pulleys 83, 84 are not illustrated for the sake of a clearer description.

The printing sheet transport mechanism has a drive portion and a driven portion. The drive portion is on the left side of the transport path where the front and rear driving transport belts 43 are located, while the driven portion is on the right side where the front and rear driven transport belts 44 are located.

In the drive portion, the front and rear driving transport belts 43 are endless belts and stretched around a drive pulley 80, pulleys 81 to 84, and idle rollers 85, respectively. The transport belts 43 are made of a polyester meshless cloth material mixed with a chloroprene rubber. resistable to expansion, which accordingly assures stable transportation of printing sheet P in the printing portion 4.

In the driven portion, the driven transport belts 44 are also endless belts and stretched around pulleys 90 to 94 and idle rollers 95. The transport belts 44 are made of an elastically flexible material such as urethane rubber and capable of being transported smoothly together with the transport belts 43. The transport belts 43, 44 have a specified width, e.g., 15 mm, respectively.

A drive shaft 804 is fixedly attached to the pulleys 80 around which the front and rear transport belts 43 are stretched respectively. The drive shaft 804 extends in the widthwise direction of the apparatus and is rotatably supported on a pair of front and rear movable belt support plates 42 to be described later. Front and rear ends of the drive shaft 804 are rotatably supported on front and rear frame walls 11, 12 which are fixedly secured to the apparatus main body.

The drive shaft 804 has a D-shape in cross section, and the drive pulleys 80 are rotated together with rotation of the drive shaft 804. A gear wheel 801 is fixedly secured to the drive shaft 804 and meshes with a gear wheel 802 of a belt driving motor 803. The belt driving motor 803 is a stepping motor. The belt driving motor 803 is rotated by way of the gears 802, 801 to rotate the pulleys 80 and rotate the front and rear transport belts 43 forward. With the forward movement of the front and rear transport belts 43, the front and rear driven transport belts 44 are driven to move forward due to frictional force between the front driving transport belt 43 and the front driven transport belt 44 and between the rear driving transport belt 43 and the rear driven transport belt 44.

Further, the pulleys 81 are attached to a rotary shaft 81*a* rotatably supported on the front and rear frame walls 11, 12, and the idle rollers 85 are rotatably supported by support shafts attached on the movable support plates 42. Likewise, the pulleys 90, 91 are attached to rotary shafts 90*a*, 91*a* rotatably supported on the front and rear frame walls 11, 12, respectively, and the idle rollers 85 are rotatably supported by support shafts attached on the movable support plates 42.

The rotary shafts in the drive portion and in the driven portion extend in the widthwise direction of the apparatus parallel with one another spaced apart by a specified distance. As mentioned above, the front and rear transport belts 43 are stretched around the pulley 80 to 84 and the idle rollers 85, respectively, and the front and rear transport belts 44 are stretched around the pulleys 90 to 94, and the idle rollers 95, respectively. Thereby, the front belt 43 in the drive portion and the front belt 44 in the driven portion are brought into pressing contact with each other by a specified pressure level from the corresponding pulleys 81 to 80 and from 91 to 90, respectively. Likewise, the rear belt 43 in the drive portion and the rear belt 44 in the driven portion are brought into pressing contact with each other by a specified pressure level from the corresponding pulleys 81 to 80 and from 91 to 90, respectively.

Further, the rotary shafts 81*a*, 91*a* rotatable together with the pulleys 81, 91 are provided with guide rollers 81*b*, 91*b* at an intermediate portion thereof, respectively. The rollers 81*b*, 91*b* have a specified length in the widthwise direction of the apparatus and are brought into pressing contact with each other at a specified pressure level. The rollers 81*b*, 91*b* are coaxially and rotatably supported about the rotary shafts 81*a*, 91*a*, respectively. When a printing sheet P is transported between the rollers 81*b*, 91*b*, a frictional force is caused between one side of the printing sheet P and an outer surface of the roller 81*b* and between the other side of the printing sheet P and an outer surface of the roller 91*b*. When the printing sheet P is transported downward between the rollers 81*b*, 91*b* along the sheet transport path by the belts 43, 44, the rollers 81*b*, 91*b* are rotated due to the frictional force.

When the drive shaft 804 is rotated in the clockwise direction in FIG. 5B, an intermediate portion of a printing sheet P fed to the printing portion 4 is nipped by the rollers 81*b*, 91*b*. At the same time, both front and rear ends of the printing sheet P are nipped by the front and rear belts 43, 44, respectively. Subsequently, the printing sheet P is transported downward from the pulleys 81, 91 to the pulleys 80, 90 in the state that the front and rear ends of the printing sheet P are continuously brought into sliding contact with the front and rear transport belts 43, 44, respectively, while an intermediate portion of the printing sheet P is being continuously guided by the guide rollers 81*b*, 91*b*. Accordingly, the printing sheet P can be reliably transported along the sheet transport path.

A rotating amount and rotating speed of the drive pulley 80, namely, a transport distance and a transport speed of printing sheet are controlled by counting the number of drive pulses supplied to the belt driving motor 803.

Further, as shown in FIG. 5B, a portion of the front (rear) transport belt 43 stretched between the corresponding pulleys 81, 82 is tilted downward as approaching toward the corresponding pulley 81, while a portion of the front (rear) transport belt 44 stretched between the corresponding pulleys 91, 92 is tilted downward as approaching toward the corresponding pulley 91 to thereby make a substantially V-shape between these two front (rear) portions. With this arrangement, after having been transported in the printing portion 4, front and rear ends of a printing sheet P can be reliably guided through front and rear apexes of the front and rear V-shaped portions defined by the front and rear transport belts 43, 44 to thereby guide the printing sheet P through the printing portion 4 reliably.

Next, a belt support plate moving mechanism for moving the front and rear belt support plates 42 carrying the belts 43, 44 will be described with reference to FIGS. 4A to 6. The pair of front and rear belt support plates 42 are provided parallel with the front and rear frame walls 11, 12. The front and rear belt support plates 42 are supported to the apparatus main body and moved toward and away from each other in the widthwise direction of the apparatus. The movable support plates 42 are adapted for selectively setting the position of the transport belts 43, 44 in accordance with the size of printing sheet.

The front (rear) support plate 42 is formed with holes through which the rotary shafts for rotatably supporting the pulleys 80 to 84, 90 to 94, and the idle rollers 85, 95 are to be passed. The front (rear) support plate 42 has four hollows each having a substantially rectangular shape formed at a specified position on a central portion thereof so that the respective printing head units 5*a*, 5*b* are insertable through the hollows in the widthwise direction of the apparatus. The front (rear) support plate 42 is further formed at a specified position on a lower portion thereof with a substantially rectangular hollow through which the dryers 10 are insertable in the widthwise direction of the apparatus.

The front (rear) support plate 42 is further formed with holes through which front (rear) sleeves 421*a*, 422*a* are fixedly attached. A slide shaft 422 which extends in the widthwise direction of the apparatus and is supported to the front and rear frame walls 11, 12 is fitted through the front and rear sleeves 422*a* of the front and rear belt support plates 42. A ball shaft 421 which also extends in the widthwise direction of the apparatus and is rotatably supported to the front and rear frame walls 11, 12 is fitted through the front and rear sleeves 421*a* of the front and rear belt support plates 42. Thus, the front and rear belt support plates 42 are supported by the slide shaft 422 and the ball shaft 421.

The front and rear belt support plates 42 are slidable on the slide shaft 422 by way of the front and rear sleeves 422*a*. The front and rear sleeves 421*a* are internally threaded, while the ball shaft 421 is externally threaded in a specified portion on front and rear ends thereof. Specifically, a substantially front half portion of the ball shaft 421 is threaded in a specified spiral direction, while a rear half portion is threaded in a direction opposite to the specified spiral direction to thereby change a rotating direction between the front and rear half portions. With this arrangement, when the ball shaft 421 is rotated in a clockwise direction in FIG. 4B, the movable support plates 42 are moved toward each other in the widthwise direction of the apparatus. On the contrary, when the ball shaft 421 is rotated in a counterclockwise direction, the plates 42 are moved away from each other.

A gear wheel 423 fixedly secured to the ball shaft 421 meshes with a gear wheel 424 of a belt support plate motor 425. The belt support plate motor 425 is a stepping motor and adapted for rotating the ball shaft 421 by way of the gears 424, 423. By rotating the ball shaft 421 in a forward direction or in a reverse direction, the movable support plates 42 are moved toward and away from each other in accordance with the sideways size of printing sheet. A rotating amount of the ball shaft 421, namely, a moving distance of the movable support plates 42 is controlled by counting the number of drive pulses supplied to the belt support plate motor 425.

In this embodiment, when a printing sheet having the size of A3 is transported, the movable support plates 42 are selectively moved to the position shown by solid lines in FIG. 4A. On the other hand, when a printing sheet having the size of A4 is transported, the plates 42 are selectively moved to the position shown by phantom lines in FIG. 4A Thus, the movable support plates 42 are selectively moved toward and away from each other in accordance with the sideways size of a printing sheet P onto which an image printing is instructed, while the pulleys 80 to 84, and 90 to 94 and transport belts 43, 44 are integrally movable in the widthwise direction of the apparatus in accordance with the inputted widthwise size of printing sheet. Thereby, the printing sheet P can be reliably transported along a sheet transport path defined by the transport belts 43, 44 by selectively setting the position of the belts 43, 44 in accordance with the widthwise size of printing sheet, while being nipped at the front and rear ends by the front and rear belts 43, 44, respectively.

In the foregoing embodiment, the front and rear driving transport belts 43 and the front and rear driven transport belts 44 are simultaneously moved toward and away from each other in the widthwise direction of the apparatus in accordance with an inputted size of printing sheet. However, either one of the front driving transport belt 43 and the front driven transport belt 44, or the rear driving transport belt 43 and the rear driven transport belt 44 may be made movable. In the case where the front driving and driven transport belts 43, 44 are made movable and the rear driving and driven transport belts 43, 44 stay in a stationary posture, the rear driving and driven transport belts 43, 44 may be moved outside the printing head units 5*a*, 5*b* only at an enclosing operation of nozzles by a capping portion or at a home position emission operation to be described later. Thus, the rear driving and driven transport belts 43, 44 in the stationary posture can reduce its moving distance.

Next, the printing mechanism in the ink jet printing apparatus will be described with reference to FIGS. 4A and 4B. As shown in FIG. 4A, the printing head unit 5*a* has an elongated box-like shape extending in the widthwise direction of the apparatus. Likewise, the printing head unit 5*b* has an elongated box-like shape extending in the widthwise direction of the apparatus.

The printing head unit 5*a* includes an ink emission portion 51*a* and a capping portion 52*a*, and the printing head unit 5*b* includes an ink emission portion 51*b* and a capping portion 52*b*. As shown in FIG. 4B, the ink emission portion 51*a* is arranged above the capping portion 52*a*. On the contrary, the ink emission portion 51*b* is arranged below the capping portion 52*b*. Thus, the ink emission portion 51*a* opposes to the capping portion 52*b*, and the ink emission portion 51*b* opposes to the capping portion 52*a*. The printing head units 5*a*, 5*b* are moved toward and away from each other by a printing head unit moving mechanism to be described later, and selectively moved to a contact position where the printing head units 5*a*, 5*b* come into contact with each other or to a spaced-away position where the printing head units 5*a*, 5*b* are spaced away from each other by a specified distance.

Specifically, when a printing sheet P is not transported along the sheet transport path, the printing head units 5*a*, 5*b* are moved to the contact position. On the other hand, when a printing sheet P is transported along the sheet transport path, the printing head unit 5*a*, 5*b* are moved to the spaced-away position spaced away from each other by a specified distance, e.g., 2 mm.

The ink emission portions 51*a*, 51*b* each includes a large number of minute nozzles which are arranged in the form of a matrix. Each nozzle is provided with a piezoelectric conversion element to control ink emission. Ink is emitted through each nozzle onto both sides of a printing sheet P simultaneously by an ink emitter provided in each nozzle to thereby print images on the both side of the printing sheet P. In this embodiment, the length of the ink emission portion is made to have a length equal to the shorter side of the A3-sized printing sheet.

Ink is supplied to the printing head units 5*a*, 5*b* by way of an unillustrated ink supply tube made of a soft synthetic resin from an ink supply portion 14. As shown in FIG. 2B, the ink supply portion 14 is arranged at an appropriate position in the main body of the ink jet printing apparatus. The ink supply portion 14 comprises four ink cartridges. The four ink cartridges contain ink of yellow color (Y), ink of magenta color (M), ink of cyan color (C), and ink of black color (BK). The ink supply tube has a needle member at an upstream end, and is connected with the ink supply portion 14 by inserting the needle member into the ink supply portion 14.

These inks are superimposedly emitted onto a printing sheet P transported in the printing portion 4 to thereby print a colored image on the printing sheet P.

It may be possible to adopt an arrangement of minute nozzles in a zigzag or in a line other than a matrix.

Further, it may be possible to provide only one pair of printing head units 5*a*, 5*b* to print a monochromatic image on a printing sheet P, e.g., a black monochromatic image.

The capping portion 52*a* (52*b*) is made of a rubber or a soft synthetic resin. When a printing is not instructed, the printing head units 5*a*, 5*b* are moved toward each other and brought into the contact state to thereby enclose the nozzles of the printing head unit 5*a* and the nozzles of the printing head unit 5*b* by the capping portion of the printing head unit 5*b* and the capping portion of the printing head unit 5*a*, respectively. This will prevent ink at a lead end of the nozzle from drying or solidifying, and foreign matters and bubbles from entering into the nozzle.

The capping portion 52*a* (52*b*) is connected with an unillustrated waste ink tube. Absorption means such as a pump 103 in FIG. 8 is provided connectably to the waste ink tube. When the nozzles are enclosed by the capping portion, the pump 103 generates an absorption force. Specifically, the pump 103 is operated to reduce the ink pressure or give a pressure, adjust meniscus of ink at the lead end of the nozzles, to draw the ink to eliminate foreign matters and bubbles and to maintain the specified emission conditions. Waste ink in the capping portion is drawn by the pump 103 through the waste ink tube, and then is introduced to a waste tank 18 by way of a waste ink tube. As shown in FIG. 2B, the waste tank 18 is arranged near the ink supply portion 14 and internally provided with an ink absorptive member such as urethane foam. The waste ink introduced to the waste tank 18 is absorbed by the ink absorptive member.

During printing operation, transport of a printing sheet to the printing portion 4 is temporarily suspended for a specified period, and the transport belts 43, 44 are temporarily retracted from the nozzles by the belt support plate moving mechanism. Subsequently, ink is forcibly emitted through all the nozzles to the capping portion to prevent less frequently used nozzles from clogging. This ink emission is referred to as "home position emission". The home position emission may be performed either in the state of the capping portion enclosing the ink emission portions 51*a*, 51*b* or in the state of the capping portion not enclosing the ink emission portions 51*a*, 51*b*.

Figure 7B:
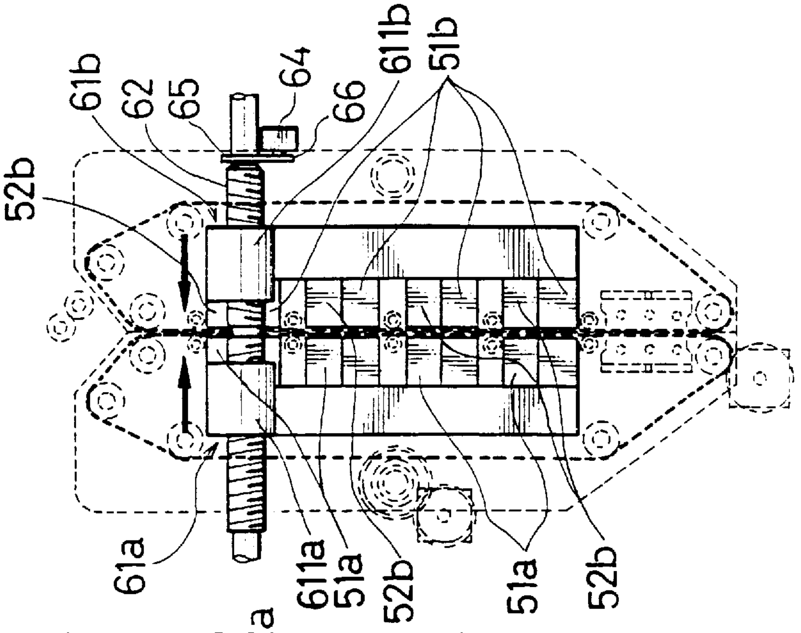
FIG. 7B is a front view showing the printing head unit moving mechanism.

Next, the printing head unit moving mechanism for moving the printing head units 5*a*, 5*b* will be described with reference to FIGS. 3 and 7.

The printing head unit moving mechanism includes a pair of front and rear carriage members 61*a* and a pair of front and rear carriage members 61*b* for supporting the printing head units 5*a* and 5*b*, respectively. The rear carriage member 61*a* (61*b*) is connected to a rear wall of the printing head unit 5*a* (5*b* ), and the front carriage member 61*a* (61*b*) is connected to a front wall of the printing head unit 5*a* (5*b*).

The front and rear carriage members 61*a* have support block 611*a*, 612*a* at an upper portion thereof, respectively. The support block 611*a* projects forward from the front frame wall 11 by a specified length in the widthwise direction of the apparatus, and the support block 612*a* projects rearward from the rear frame wall 12 by a specified length. The support blocks 611*a*, 612*a* are formed with through holes 62*a*, 63*a*, respectively. Likewise, the front and rear carriage members 61*b* have support blocks 611*b* and 612*b* at an upper portion. The support block 611*b* projects forward from the front frame wall 11 by a specified length, and the support block 612*b* projects rearward from the rear frame wall 12 by a specified length. The support blocks 611*b*, 612*b* are formed with through holes 62*a*, 63*a*, respectively.

A slide shaft 63 extending in the lengthwise direction of the apparatus is supported on the main body of the ink jet printing apparatus, and is passed through the holes 63*a*. The support blocks 612*a*, 612*b* are slidable on the slide shaft 63.

Also, a ball shaft 62 extending in the lengthwise direction of the apparatus is rotatably supported on the apparatus main body, and is passed through the holes 62*a*. The holes 62*a* are internally threaded. However, the thread direction of the hole 62*a* in the support block 611*a* is opposite to that of the hole 62*a* in the support block 611*b*. The ball shaft 62 is externally threaded in a specified portion on left and right ends thereof. Specifically, a substantially left half portion of the ball shaft 62 is threaded in a specified spiral direction, while a right half portion is threaded in a direction opposite to the specified spiral direction to thereby change the rotating direction between the left and right half portions. With this arrangement, when the ball shaft 62 is rotated in a clockwise direction in FIG. 7A, the front and rear carriage members 61*a*, 61*b* are moved away from each other in the lengthwise direction of the apparatus, while being moved toward each other when the ball shaft 62 is rotated in a counter-clockwise direction.

A gear wheel 65 is fixedly secured to the ball shaft 62. The gear wheel 65 is meshed with a gear wheel 66 connected to a head support plate motor 64. The head support plate motor 64 is a stepping motor and adapted for rotating the ball shaft 62 by way of the gear wheels 66, 65. A rotating amount of the ball shaft 62, i.e., a moving amount of the front and rear carriage members 61*a*, 61*b* is controlled by counting the number of drive pulses supplied to the head support plate motor 64.

Next, movement of the printing head units 5*a*, 5*b* will be described.

When the printing operation is finished, the ball shaft 421 is rotated in a counterclockwise direction in FIG. 3B to thereby move the movable support plates 42 away from each other in the widthwise direction of the apparatus. Thereby, the transport belts 43, 44 are moved outside the printing head units 5*a*, 5*b*, respectively. Subsequently, the ball shaft 62 is rotated in a counterclockwise direction in FIG. 7A to move the front and rear carriage members 61*a*, 61*b* toward each other in the lengthwise direction of the apparatus. Thereby, the printing head units 5*a*, 5*b* are moved toward each other and brought into the contact state to close the nozzles by the capping portion.

Figure 7A:
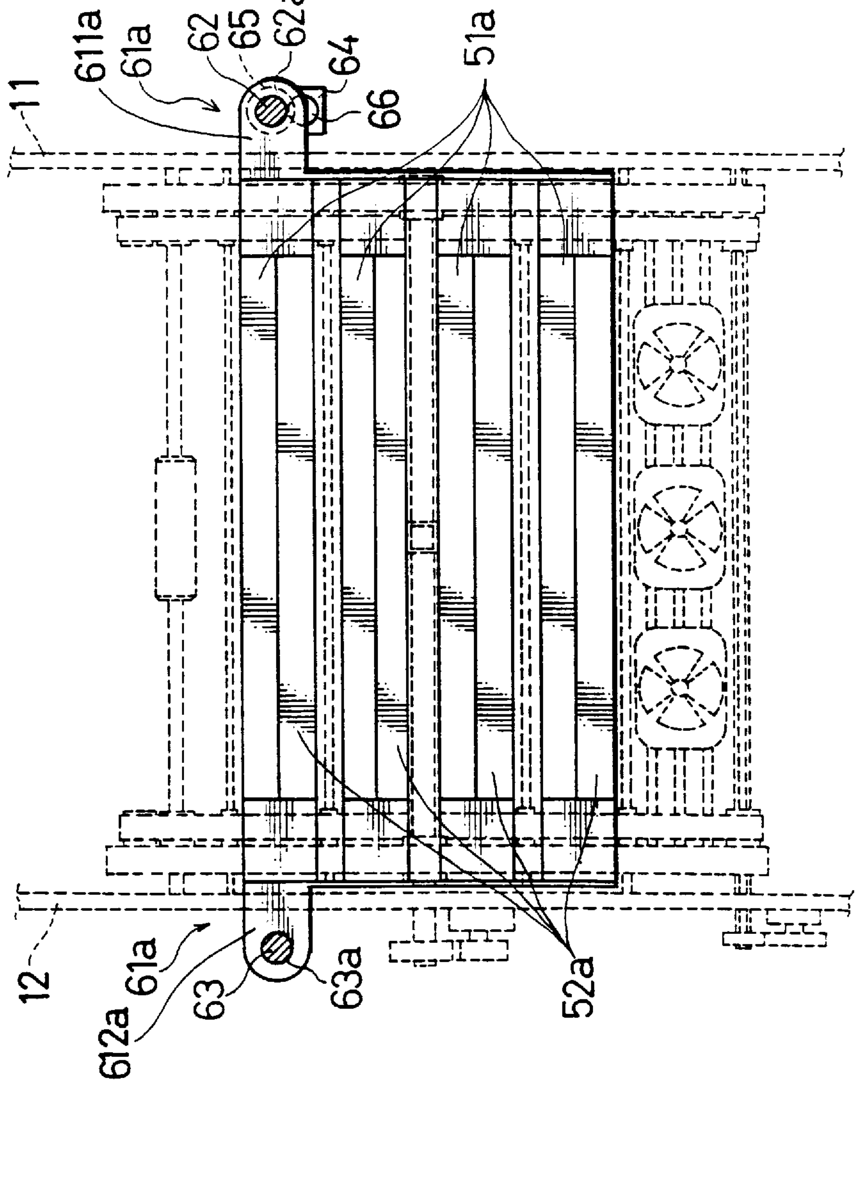
FIG. 7A is a left side view showing the printing head unit moving mechanism.

On the other hand, when the printing operation is instructed, the ball shaft 62 is rotated in a clockwise direction in FIG. 7A to move the front and rear carriage members 61*a*, 61*b* away from each other in the lengthwise direction of the apparatus, respectively. Consequently, the printing head units 5*a*, 5*b* are moved away from each other and brought into the spaced-away state to open the nozzles. Subsequently, the ball shaft 421 is rotated in a clockwise direction in FIG. 3B by a specified rotating amount to move the movable support plates 42 toward each other so that the transport belts 43, 44 are selectively moved to a position spaced apart from each other by a specified distance in accordance with the sideways size of printing sheet onto which an image is to be printed.

In this way, the respective nozzles of the printing head units 5*a* and 5*b* are opened and closed by rotating the ball shaft 62 to move the carriage members 61*a*, 61*b* toward and away from each other.

In this embodiment, the front and rear carriage members 61*a*, 61*b* are simultaneously moved toward and away from each other. However, only one group of carriage members may be moved toward and away from the other group of carriage members which is held stationary to allow one printing head unit to move toward and away from the other printing head unit. In this case, the nozzles of one printing head unit can be closed or opened by the capping portion of the other printing head unit.

A structure of the dryer 10 will be described next with reference to FIGS. 3A and 3B. The dryer 10 is provided both on the drive portion and the driven portion of the printing sheet transport mechanism. Specifically, the dryers 10 are arranged in the printing portion 4 on a downstream end with respect to the sheet transport direction, respectively. The dryers 10 oppose to each other along the sheet transport path. The dryers 10 each include a plurality of fans 101 and heaters 102. As shown in FIG. 3A, for example, the three fans 101 in the drive portion are arranged side by side in the widthwise direction of the apparatus by a specified distance to send heated air toward one side of a printing sheet P having an ink image printed thereon to dry the ink. Likewise, three fans 101 in the driven portion are arranged side by side to send heated air toward the other side of the printing sheet P. The heater 102 has a heat source such as a halogen lamp and a heating (nichrome) wire and extends in the widthwise direction of the apparatus having a length substantially identical to the length of the printing head units 5*a*, 5*b*. The heaters 102 of the respective dryers 10 are arranged parallel with one another by a specified distance in the sheet transport direction and interposed between the sheet transport path and the fans 101. With this arrangement, air heated by the heaters 102 is blown out by the fans 101 to both sides of a printing sheet P to dry ink of a printed image on the both sides.

Next, a control system of the ink jet printing apparatus will be described with reference to a block diagram in FIG. 8.

The ink jet printing apparatus is communicated with the image generator such as a personal computer, and operates in accordance with an operation signal and an image signal sent from the image generator.

The control system of the ink jet printing apparatus is provided with a controller 110 including a microcomputer. The controller 110 is internally provided with a CPU (Central Processing Unit) 120, a memory unit 111 and an interface portion 112. The CPU 120 controls an overall operation of the apparatus in timed relation with a clock signal. The CPU 120 has an emission control portion 121, a movement control portion 122, and a display control portion 123. The emission control portion 121 and the movement control portion 122 mutually and synchronously control various operations of the ink jet printing apparatus. The memory unit 111 includes an ROM (Read Only Memory) for storing a control program and an RAM (Random Access Memory) for temporarily storing image data.

An image signal generated from the image generator is received by the interface portion 112, and then sent to the emission control portion 121. The operation signal indicative of a sheet size and the like is also received by the interface portion 112 and sent to the movement control portion 122.

The movement control portion 122 sends a control signal to a drive circuit 114 which in turn drives the printing sheet transport assembly 13 to transport a printing sheet P from a specified cassette. When a lead end of the printing sheet P has reached the registration roller pair 38 and is reliably nipped between the registration roller pair 38 after forming a specified bulge portion, the driving of the printing sheet transport assembly 13 is temporarily suspended. The movement control portion 122 further controls driving of the printing sheet transport assembly 13 to start rotating the registration roller pair 38 to transport the printing sheet P nipped thereat to the printing portion 4 downward. The movement control portion 122 further controls driving of the sorter 8 every time an image printing is finished onto a printing sheet or a plurality of printing sheets. When sorting is not designated, the printing sheet(s) having been finished with the image printing is (are) stacked in an uppermost tray, while being sorted out and placed onto the plurality of bin trays 8*a* one by one when sorting is designated. At the same time, the movement control portion 122 sends a control signal to the drive circuit 114 which in turn sends drive pulses to the belt driving motor 803, belt support plate motor 425, head support plate motor 64. The drive circuit 114 includes a power and a transistor. The drive circuit 114 supplies an electric current to the respective motors for driving based on a control signal sent from the movement control portion 122.

The movement control portion 122 is provided with timers Tr1, Tr2, Tr3. The timer Tr1 counts a predetermined time period T1 from a timing at which the feed roller starts rotating to feed a first printing sheet P1 to a timing at which the registration roller pair 38 starts rotating. The timer Tr2 counts a predetermined time period T2 from the timing at which the registration roller pair 38 starts rotating to a timing at which an ink emission operation starts. The timer Tr3 counts a predetermined time period T3 from the timing at which the registration roller pair 38 starts rotating to a timing at which the feed roller is driven to feed a next printing sheet P2 from a specified cassette.

The movement control portion 122 further controls an operation of the fans 101 and heaters 102. Further, the control portion 122 controls driving of the pump 103 to allow the pump 103 to execute a specified ink pressure stabilizing operation at a specified interval or at a timing at which the emission stabilizing key in the operation section 1*a* is depressed during an ON state of the apparatus, or at a turning on of the power of the apparatus main body.

When a sheet size manually designated through the printing sheet size designation keys in the operation section 1*a* is larger than the size inputted through the image generator, the movement control portion 122 may allow a printing sheet whose size is identical to the sheet size manually designated through the designation keys to be fed from the corresponding cassette.

An image signal generated from the image generator is received by the ink emission control portion 121, which in turn sends the image signal serially to driving circuits 113*a*, 113*b* arranged at an appropriate position in the printing head units 5*a*, 5*b*, respectively. The image signal is a serial signal in the form of one bit or a plurality of bits, e.g. eight bits. The driving circuits 113*a*, 113*b* each include a latch portion. The driving circuits 113*a*, 113*b* receive, temporarily latch the image signal, then convert the latched serial signal to parallel signals, and send the parallel signals to the piezoelectric conversion elements provided in the nozzles in the ink emission portions 51*a*, 51*b* in synchronism with one another.

The ink emission control portion 121 outputs the parallel signals sent from the driving circuits 113, 113*b* as a pulse drive signal to the piezoelectric conversion elements in the nozzles in synchronism with the operation of the movement control portion 122, to thereby control the ink emission. More specifically, each nozzle has an ink reservoir whose wall is partially defined by the piezoelectric conversion element. The piezoelectric conversion element is strained by applied voltage to increase the internal pressure of ink in the reservoir to emit the ink out of the nozzle. For example, in the case of receiving the image signal in the form of one bit, the driving circuits 113*a*, 113*b* send a parallel drive signal having the two states of "on" and "off" to the piezoelectric conversion element of the corresponding nozzle. In the "on" state, the piezoelectric conversion element is applied with a specified level of voltage to increase the pressure of the reservoir, so that a stream of ink forcibly spouts onto both sides of the printing sheet P out of the nozzle. In this way, one line of an image is printed each time the image signal corresponding to the line is sent to the driving circuits 113*a*, 113*b*. These one-line printings are successively repeated to complete the whole image printing.

A cyclic period of ink emission, namely, an interval between outputting parallel signals to the piezoelectric conversion elements to print one line of image and to print a next one line of image, primarily depends on the capability of the printing head units 5*a*, 5*b*. The transport speed of printing sheet during printing operation, namely, rotating speed of the transport belt motor 803 is set in accordance with the cyclic period of ink emission.

A remaining ink detector 115 detects a remaining ink amount in the ink cartridges and sends detection signals indicative of the remaining ink amount to the display control portion 123, which in turn causes the display section 1*b* to display necessity of replacement of the ink cartridges with new ones in the case where the remaining ink amount falls below a predetermined level. The display control portion 123 also causes the display section 1*b* to display the absence of printing sheet in each cassette.

Next, printing operation of the ink jet printing apparatus will be described with reference to flowcharts in FIGS. 9 to 16.

Figure 9:
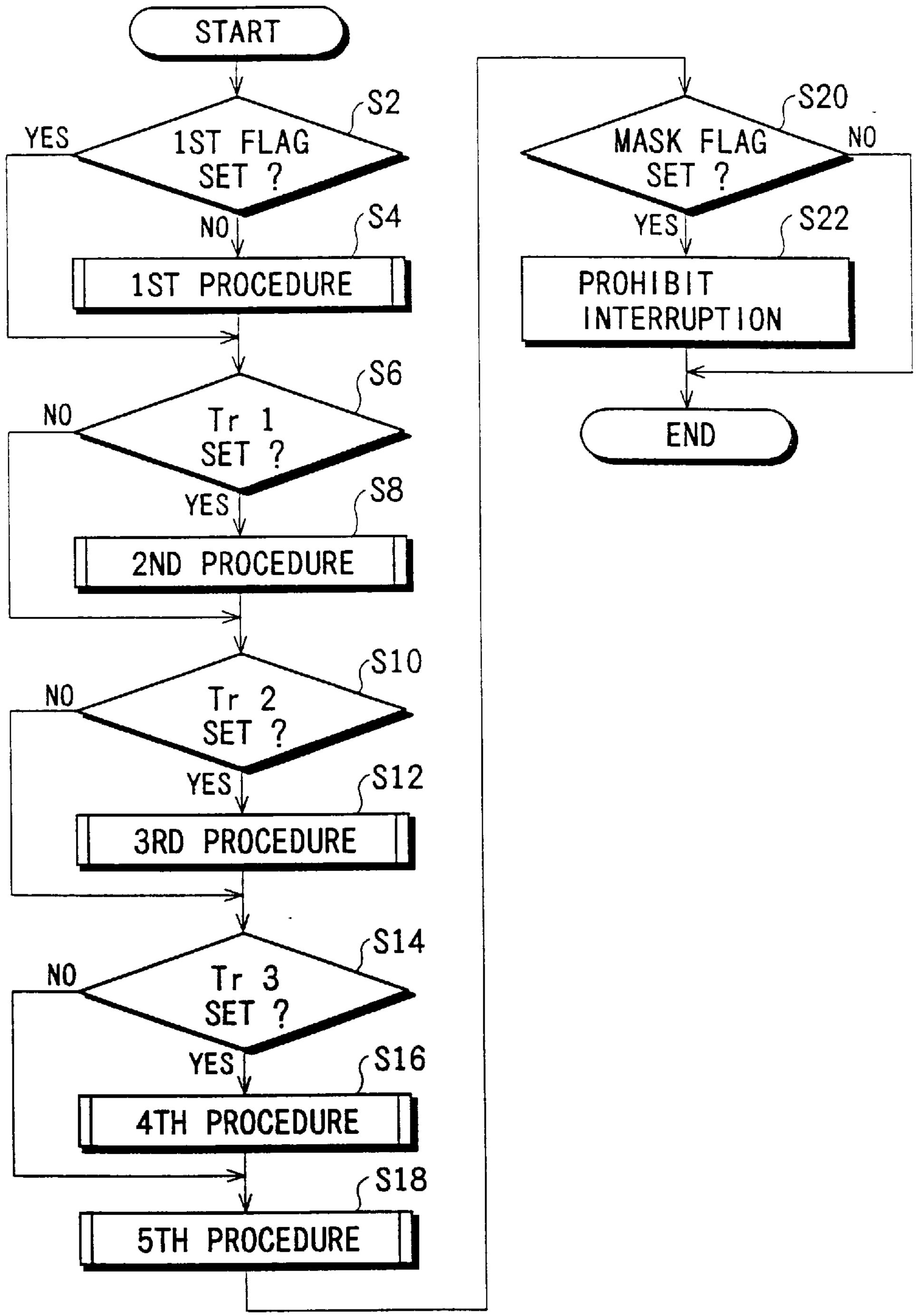
FIG. 9 is a flowchart showing a main routine of printing operation of the ink jet printing apparatus.

Referring to a main routine in FIG. 9, it is judged in Step S2 whether or not a first procedure flag indicative that a first procedure is completed is set. If it is judged that the first procedure flag is set (YES in Step S2), the routine proceeds to Step S6. If it is judged that the first procedure flag is not set (NO in step S2). the first procedure is performed in Step S4.

Subsequently, it is judged in Step S6 whether or not a timer Tr1 is set. If it is judged that the timer Tr1 is not set (NO in Step S6), the routine proceeds to Step S10. If it is judged that the timer Tr1 is set (YES in Step S6). a second procedure is performed (Step S8).

Next, it is judged in Step S10 whether or not a timer Tr2 is set. If it is judged that the timer Tr2 is not set (NO in Step S10), the routine proceeds to Step S14. If it is judged that the timer Tr2 is set (YES in Step S10), a third procedure is performed (Step S12).

Subsequently, it is judged in Step S14 whether or not a timer Tr3 is set. If it is judged that the timer Tr3 is not set (NO in step S14), the routine proceeds to Step S18. If it is judged that the timer Tr3 is set (YES in Step S14), a fourth procedure is performed (Step S16).

Next, a fifth procedure is performed in Step S18. Then, it is judged in Step S20 whether or not a printing interruption mask flag is set. If it is judged that the interruption mask flag is not set (NO in Step S20), the routine ends. If it is judged that the interruption mask flag is set (YES in Step S20), an interruption operation is prohibited in Step S22. Then, this routine ends.

Figure 10:
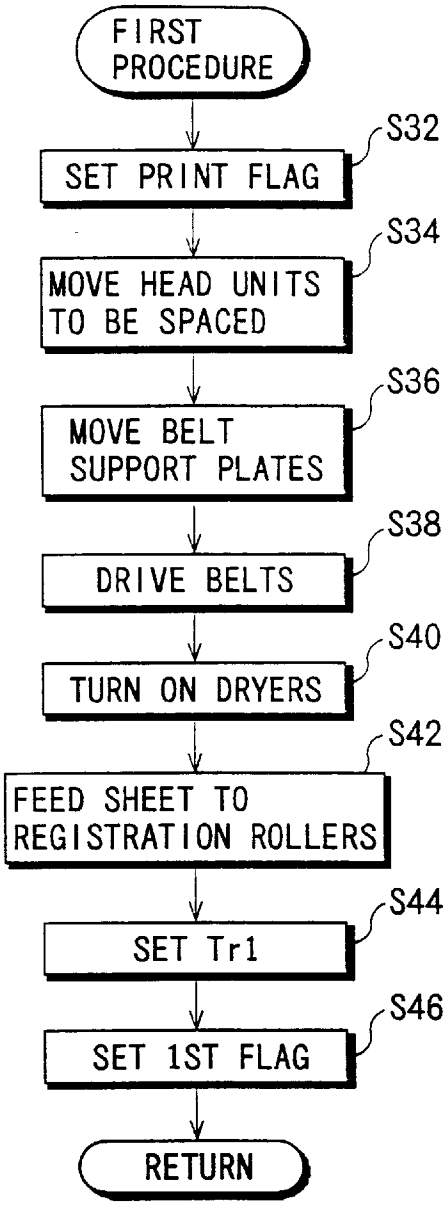
FIG. 10 is a flowchart showing a first procedure of the printing operation.
Figure 11:
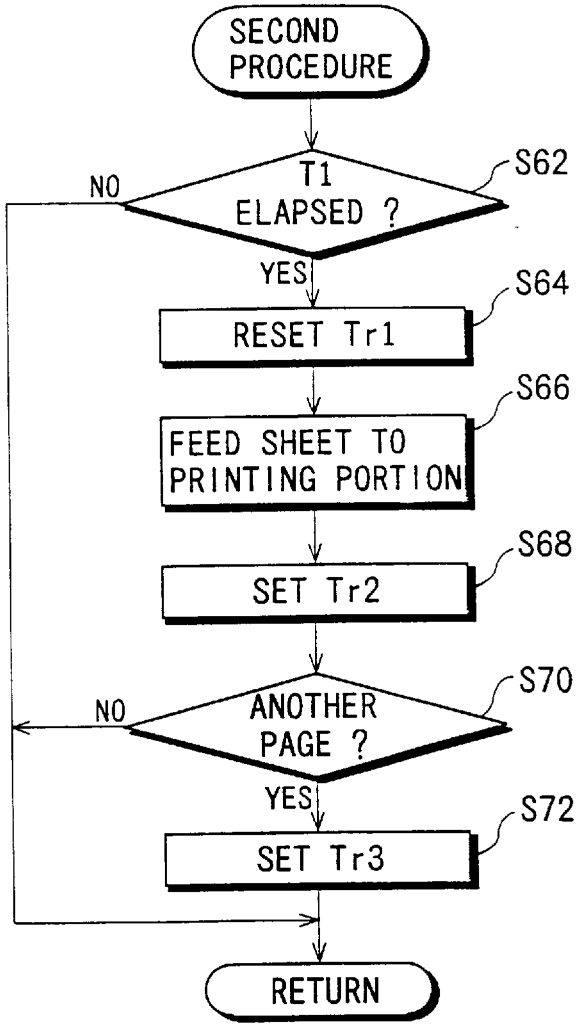
FIG. 11 is a flowchart showing a second procedure of the printing operation.

Next, the first procedure will be described with reference to FIG. 10. A print flag indicative that a printing is designated is set in Step S32. Subsequently, the front and rear carriage members 61*a*, 61*b* are moved to a spaced-away position to open the nozzles from the capping portion, and the printing head units 5*a* and 5*b* are moved to a spaced-away position having a specified distance in Step S34. Subsequently, the movable belt support plates 42 are selectively moved to a specified position to render the transport belts 43, 44 spaced away by a specified distance in accordance with an inputted size of printing sheet in Step S36.

Subsequently, driving of the transport belts 43 is started in Step S38, and the dryers 10 are turned on in Step S40. A first printing sheet P1 is dispensed from a specified cassette and fed to the registration roller pair 38 in Step S42, and then the timer Tr1 is set to count up a predetermined time period T1 in Step S44. Then, the first procedure flag indicative that the first procedure is completed is set in Step S46. After setting the first procedure flag, the procedure returns to the main routine.

Figure 12:
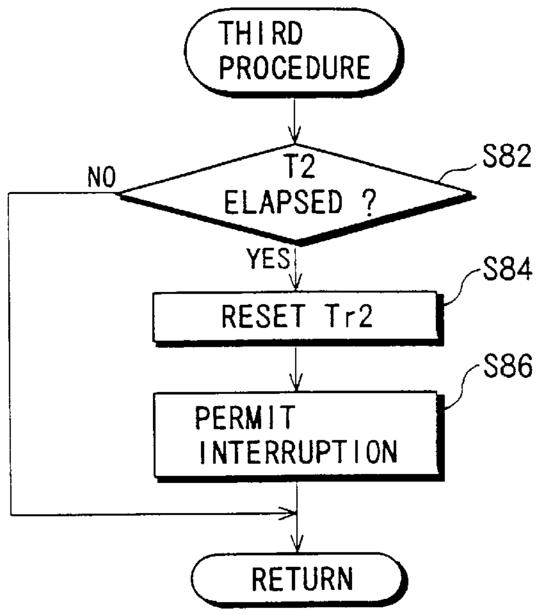
FIG. 12 is a flowchart showing a third procedure of the printing operation.

Next, the second procedure will be described with reference to FIG. 12. It is judged in Step S62 whether or not the timer Tr1 has counted up the predetermined time period T1. If it is judged that the predetermined time period T1 has not elapsed (NO in Step S62), this procedure goes back to the main routine. If it is judged that the predetermined time period T1 has elapsed (YES in Step S62), the timer Tr1 is reset to suspend the counting up of the time period T1 in Step S64.

Subsequently, the printing sheet P1 is fed downward from the registration roller pair 38 to the printing portion 4 in Step S66. Then, the timer Tr2 is set to count up a predetermined time period T2 in Step S68.

Next, it is judged in Step S70 whether or not there exists another page having an image with respect to which a printing is to be operated. If it is judged that there exists no another page (NO in Step S70), the procedure goes back to the main routine. If it is judged that there exists the another page (YES in Step S70), the timer Tr3 is set to count up a predetermined time period T3 in Step S72. Then, the procedure returns to the main routine.

Next, the third procedure will be described with reference to FIG. 12. It is judged in Step S82 whether or not the timer Tr2 has counted up the predetermined time period T2. If it is judged that the predetermined time period has not elapsed (NO in Step S82), the procedure goes back to the main routine. If it is judged that the predetermined time period has elapsed (YES in Step S82), the timer Tr2 is reset to suspend the counting up of the predetermined time period T2 in Step S84. Subsequently, a printing interruption operation is permitted in Step S86. Then, the procedure goes back to the main routine.

Figure 13:
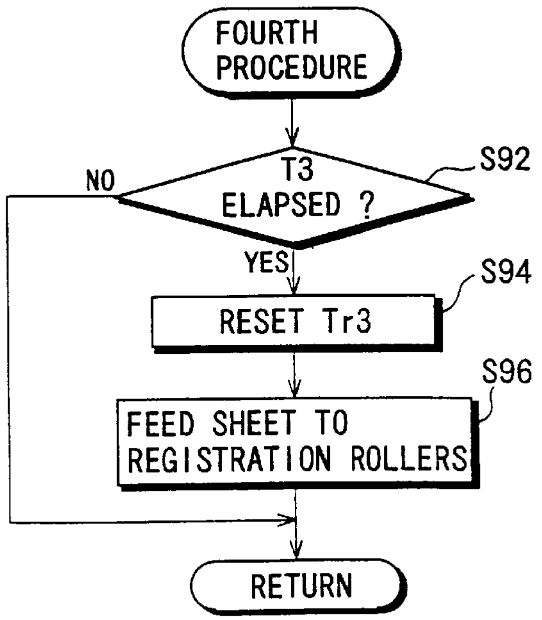
FIG. 13 is a flowchart showing a fourth procedure of the printing operation.

Next, the fourth procedure will be described with reference to FIG. 13. First, it is judged in Step S92 whether or not the timer Tr3 has counted up the predetermined time period T3. If it is judged that the predetermined time period has not elapsed (NO in Step S92), the procedure returns to the main routine. If it is judged that the predetermined time period has elapsed (YES in Step S92), the timer Tr3 is reset to suspend the counting up of the time period T3 in Step S94. Subsequently, a second printing sheet P2 is fed from a specified cassette to the registration roller pair in Step S96. Then, the procedure returns to the main routine.

Figure 14:
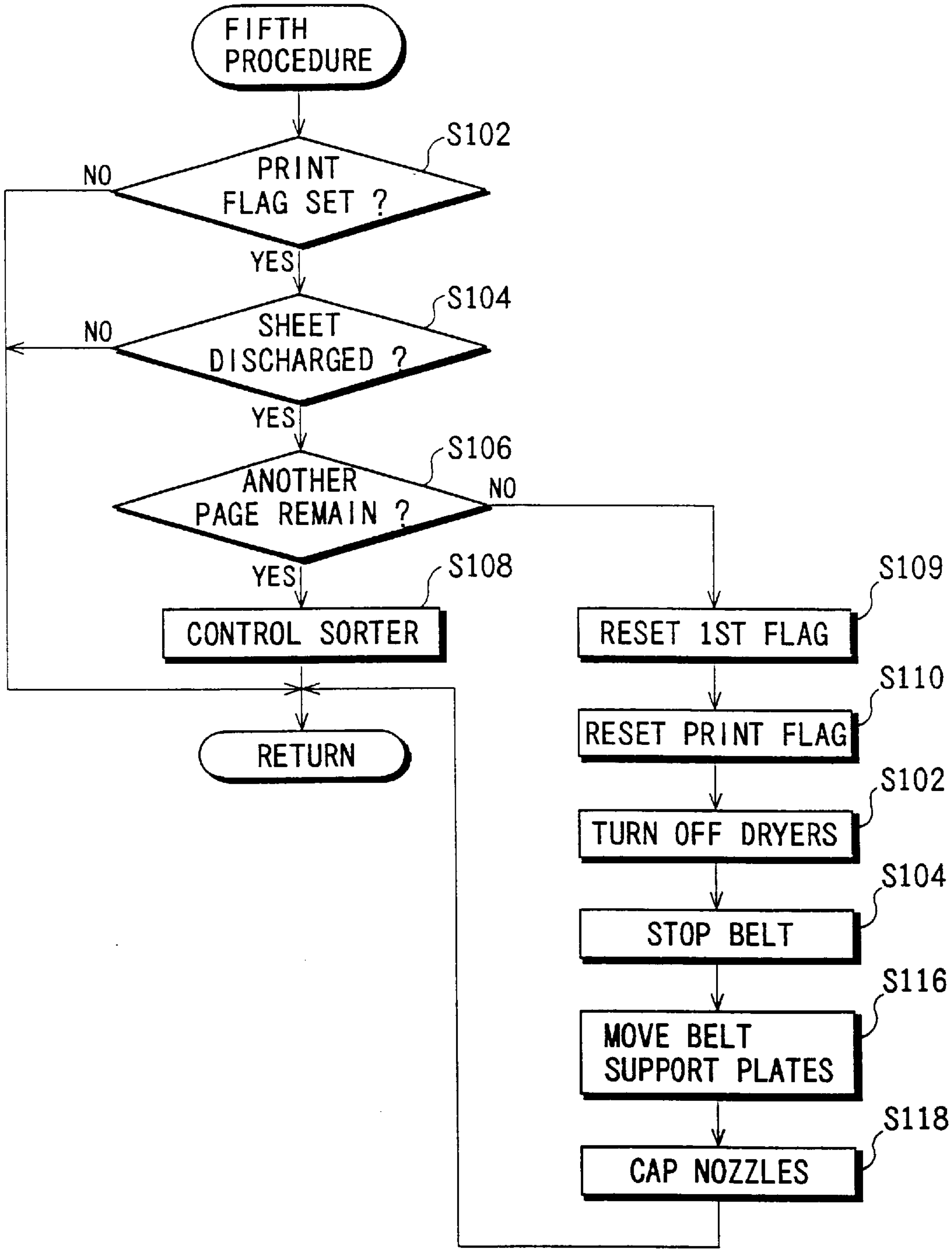
FIG. 14 is a flowchart showing a fifth procedure of the printing operation.

Next, the fifth procedure will be described with reference to FIG. 14. It is judged in Step S102 whether or not the print flag is set. If it is judged that the print flag is not set (NO in Step S102), the procedure returns to the main routine. If it is judged that the print flag is set (YES in Step S102), then, it is judged in Step S104 whether or not the first printing sheet P1 has been discharged from the main apparatus. If it is judged that the first printing sheet P1 has not been discharged (NO in Step S104), the procedure returns to the main routine. If it is judged that the first printing sheet P1 has been discharged (YES in Step S104), then it is judged in Step S106 whether or not there remains another page having an image with respect to which a printing is to be executed.

If it is judged that there remains the another page having the image (YES in Step S106), the sorter 8 is controlled to move the bin trays 8*a* upward or downward to sort out in Step S108. Then, the procedure returns to the main routine. If it is judged that there remains no another page (NO in Step S106), the first procedure flag is reset in Step S109, the print flag is reset in Step S110, the dryers 10 are turned off in Step S112, driving of the transport belts 43 are stopped in Step S114, and the movable support plates 42 are moved to a spaced-away position to move the belts 43, 44 outside the printing head units 5*a* and 5*b* in Step S116. Then, the carriage members 61*a*, 61*b* are moved to a contact position to enclose the nozzles by the capping portion in Step S118. Consequently, the procedure returns to the main routine.

Figure 15:
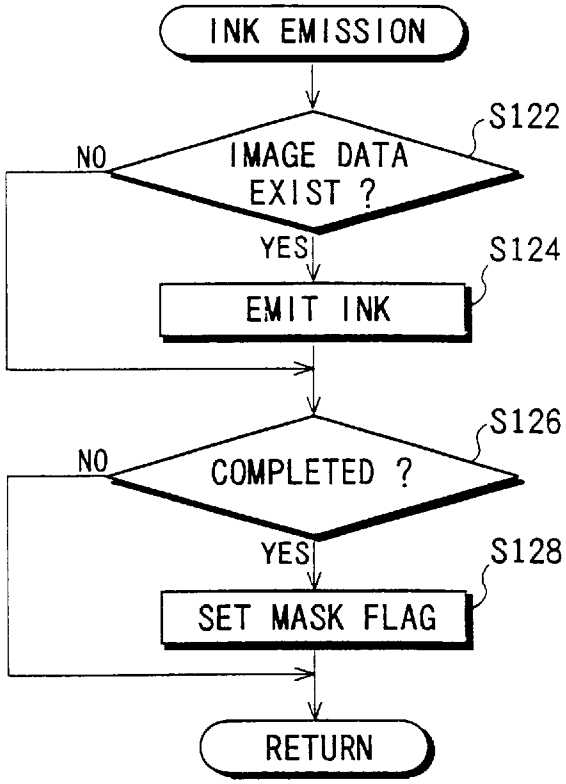
FIG. 15 is a flowchart showing an ink emission procedure.

FIG. 15 is a flowchart showing an ink emission which is performed when a printing interruption is permitted. First, it is judged in Step S122 whether or not image data exists. If it is judged that there exists no image data (NO in Step S122), the procedure goes to Step S126. If it is judged that there exists the image data (YES in Step S122), ink emission is performed to print an image in accordance with the image data onto a printing sheet in Step S124.

Subsequently, it is judged in Step S126 whether or not the image printing is completed. If it is judged that the image printing is not completed (NO in Step S126), the procedure returns to the main routine. If it is judged that the image printing is completed (YES in Step S126), the interruption mask flag is set in Step S128. Then, the procedure returns to the main routine.

As mentioned above, the transport belts 43, 44 are selectively movable in the widthwise direction of the apparatus in accordance with a widthwise size of printing sheet. Thus, a printing sheet can be transported along the transport path defined by the transport of the belts 43, 44, while both front and rear ends of the printing sheet being nipped by the belts 43, 44. Accordingly, printing sheets of various sizes can be reliably transported along the transport path, and an image can be printed on both sides of the printing sheet simultaneously by the printing head units 5*a*, 5*b*.

Next, a second ink jet printing apparatus embodying the present invention will be described with reference to FIGS. 16 to 23. It should be appreciated that elements identical to those shown in the foregoing ink jet printing apparatus will be indicated at the same reference numerals.

Figure 16:
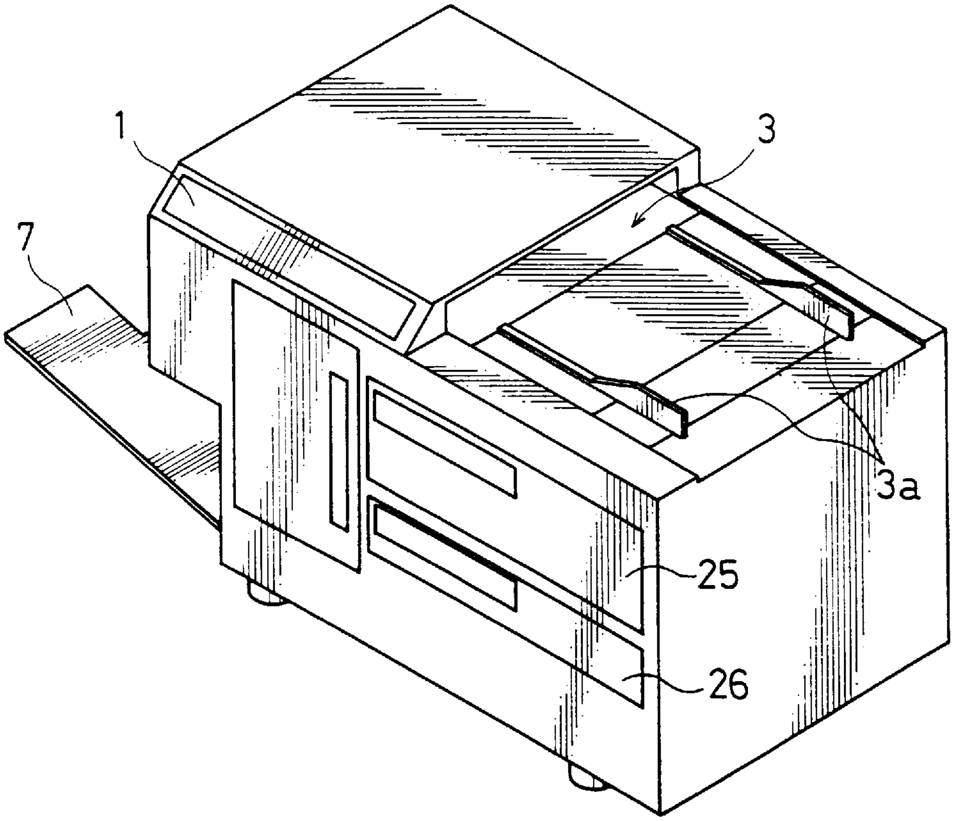
FIG. 16 is a perspective view showing an external appearance of a second ink jet printing apparatus embodying the invention.
Figure 17:
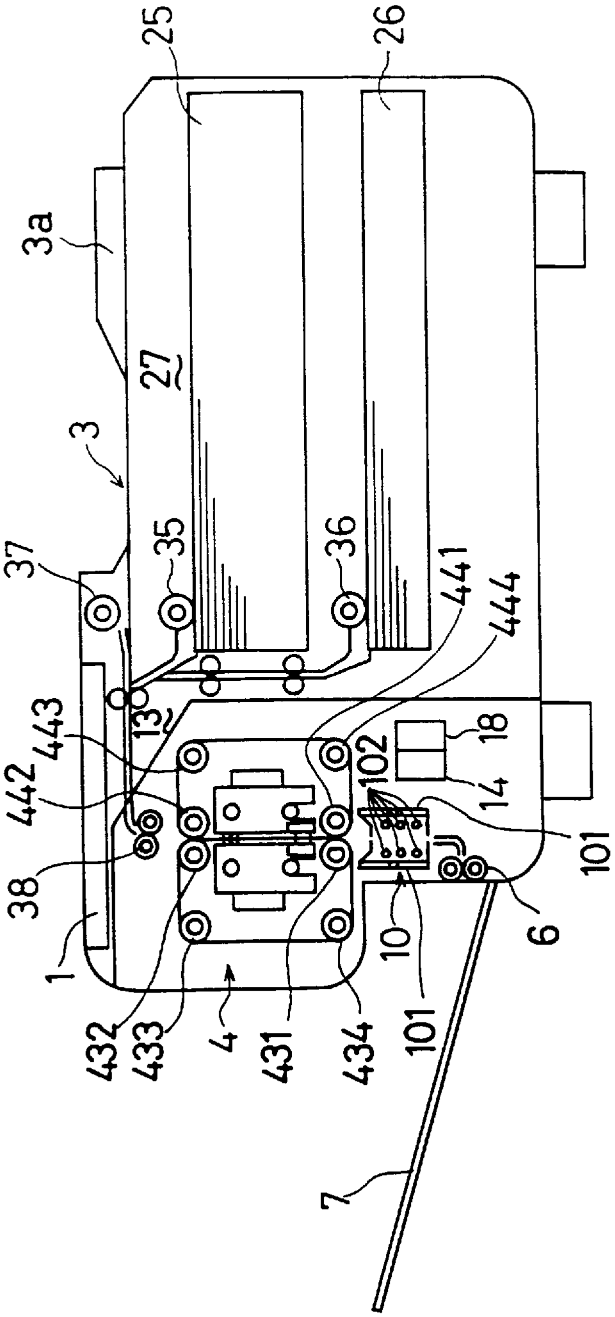
FIG. 17 is a schematic front sectional view showing an internal arrangement of the second ink jet printing apparatus.

FIG. 16 is a perspective view showing an external appearance of the second ink jet printing apparatus. FIG. 17 is a schematic front view showing an internal arrangement of the second ink jet printing apparatus.

It should be appreciated that also in the second ink jet printing apparatus, a direction from right to left or left to right in FIG. 17 is referred to as a "lengthwise direction of the apparatus" and a direction perpendicular to this direction is referred to as a "widthwise direction of the apparatus".

In the second ink jet printing apparatus, a pair of printing head units 5*a* and 5*b* are simultaneously moved in a widthwise direction of the apparatus to print one line of image on both sides of the printing sheet P while the printing sheet P is temporarily stayed. After the one-line image printing, the printing sheet P is fed by a specified distance corresponding to the one-line downward in a printing portion 4. In this time, the printing head units 5*a* and 5*b* are simultaneously moved in a reverse direction to start printing of a next one line.

After the next one-line printing, the printing sheet P is transported by a specified distance corresponding to the next one-line. In this way, one-line image printing by reciprocal and simultaneous movement of the printing head units 5*a* and 5*b* and feeding of printing sheet by the specified distance corresponding to the one-line are alternately performed to print a whole image on both sides of the printing sheet P.

The ink jet printing apparatus is connected with an unillustrated image generator such as personal computers to print an image generated in the image generator on a printing sheet P.

Referring to FIG. 17, the ink jet printing apparatus includes a printing sheet storage portion 27 in a right side thereof, a printing portion 4 including dryers 10 in a left side, and a printing sheet transport assembly 13 between the printing sheet storage portion 27 and the printing portion 4.

The printing sheet storage portion 27 includes a plurality of cassettes 25 and 26 for storing different sized printing sheets respectively. The printing sheet transport assembly 13 transports a printing sheet P dispensed from one of the cassettes 25 and 26 in the printing sheet storage portion 27 to the printing portion 4 where an ink image is printed on one side of the printing sheet P or on both sides of the printing sheet P. After the ink image on the one or the both sides of the printing sheet P has been air-dried, the printing sheet P is guided by a pair of discharge rollers 6 disposed on a downstream of the printing portion 4 and discharged onto a discharge tray 7 out of the apparatus. Similarly to the foregoing ink jet printing apparatus, the ink jet printing apparatus is further provided with an operation panel 1 and a printing sheet bypass portion 3 at an appropriate position on a top thereof.

In the printing sheet storage portion 27, the cassettes 25 and 26 are arranged one over another. In this embodiment, for example, the cassette 25 contains printing sheets of A4 size with the longer side thereof in parallel with the lengthwise direction of the apparatus; and the cassette 26 contains printing sheets of A3 size with the longer side thereof in parallel with the lengthwise direction of the apparatus.

The printing sheet transport assembly 13 comprises feed rollers 35 to 37, transport roller pairs, and a pair of registration rollers 38. The feed rollers 35, 36 are adapted for dispensing printing sheets from the corresponding cassettes 25 and 26 one by one, and the feed roller 37 feeds a printing sheet inserted manually through the printing sheet bypass portion 3. A printing sheet P dispensed from the cassettes 25, 26 or fed through the printing sheet bypass portion 3 is transported downstream by the corresponding transport roller pair.

The printing sheet P is temporarily nipped between a drive roller and a driven roller of the registration roller pair 38. After a skew transport of the printing sheet P is corrected, if any, the drive roller of the registration roller pair 38 starts rotating in a forward direction to transport the printing sheet P in timed relation with ink jet operation to the printing portion 4.

An arrangement of the printing portion 4 will be described with reference to FIGS. 16 to 18. The printing portion 4 includes a printing sheet transport mechanism.

The printing sheet transport mechanism includes a pair of front and rear driving transport belts 43 and a pair of front and rear driven transport belts 44. The transport belts 43 are endless belts and stretched around corresponding drive pulley 431 and pulleys 432 to 434, respectively. The transport belts 44 are also endless belts and stretched around corresponding pulleys 441 to 444, respectively. The pulleys 432 to 434, and 441 to 444 are rotatably attached to front and rear belt support plates 42 to be described later, respectively.

A drive shaft 804 is fixedly attached to the pulleys 431 and is rotatable supported on the movable support plates 42. Rear and front ends of the drive shaft 804 are rotatably supported on front and rear frame walls of a main body of the apparatus.

The drive shaft 804 has a D-shape in cross section and the drive pulleys 431 are rotated together with rotation of the drive shaft 804. A gear wheel 801 is fixedly secured to the drive shaft 804 and meshes with a gear wheel 802 of a belt driving motor 803. The belt driving motor 803 is a stepping motor. The drive shaft 804 is rotated by the belt driving motor 803 by way of the gears 802, 801 to rotate the pulleys 431 and rotate the transport belts 43 forward.

A printing sheet P transported in the printing portion 4 is transported downward in a vertical direction with its front and rear ends nipped between the front driving transport belt 43 and the front driven transport belt 44 and between the rear driving transport belt 43 and the rear driven transport belt 44, respectively.

A rotating amount of the pulleys 431, namely moving distance of printing sheet is controlled by counting the number of drive pulses supplied to the belt driving motor 803.

Next, a belt support plate moving mechanism for moving the belt support plates 42 will be described. The pair of front and rear belt support plates 42 are supported to the apparatus main body and moved toward and away from each other in the widthwise direction of the apparatus. The front (rear) support plate 42 is formed with a hole through which a front (rear) sleeve 421*a* is fixedly attached. A ball shaft 421 which extends in the widthwise direction of the apparatus is fitted through the front and rear sleeves 421*a* of the front and rear belt support plates 42. The front and rear sleeves 421*a* are internally threaded, while the ball shaft 421 is externally threaded in a specified portion on front and rear ends thereof. Specifically, a front half portion of the ball shaft 421 is threaded in a specified spiral direction, while a rear half portion is threaded in a direction opposite to the specified spiral direction to thereby change the rotating direction between the front and rear half portions.

A gear wheel 423 fixedly secured to the ball shaft 421 meshes with a gear wheel 424 of a belt support plate motor 425. The belt support plate motor 425 is a stepping motor and adapted for rotating the ball shaft 421 by way of the gears 424, 423. By rotating the ball shaft 421 in a forward direction or in a reverse direction, the movable support plates 42 are moved toward and away from each other in accordance with the sideways size of printing sheet.

The rotating amount of the ball shaft 421, namely, moving distance of the support plates 42 is controlled by counting the number of drive pulses supplied to the belt support plate motor 425.

In this embodiment, a maximum size of printing sheet capable of being transported for printing is set at the size of A3. Accordingly, the home position of the belt support plates 42 is set at a position where the transport belts 43, 44 are spaced apart by a specified distance to transport the A3-sized printing sheet.

As mentioned above, the movable support plates 42 are selectively moved toward and away from each other in accordance with the sideways size of a printing sheet P onto which an image is to be printed. The printing sheet P can be reliably transported along a sheet transport path defined by the transport belts 43, 44 by selectively setting the position of the belts 43, 44 in accordance with the widthwise size of printing sheet, while being nipped at the front and rear ends by the front and rear belts 43, 44, respectively.

Next, an arrangement of the printing head units 5*a* and 5*b* will be described with reference to FIG. 18 to 19C.

Figure 18:
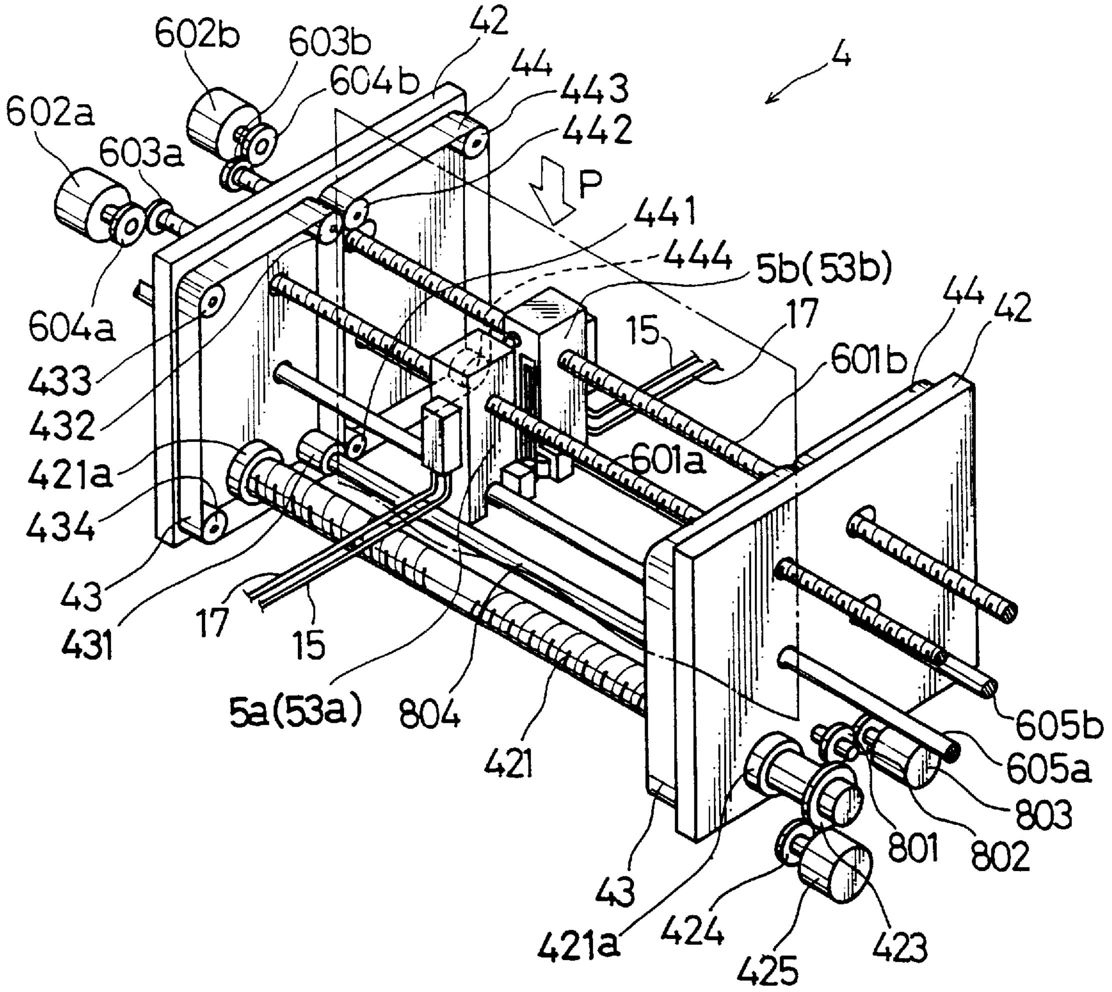
FIG. 18 is a perspective view schematically showing a printing sheet transport mechanism of the second ink jet printing apparatus.
Figure 19A:
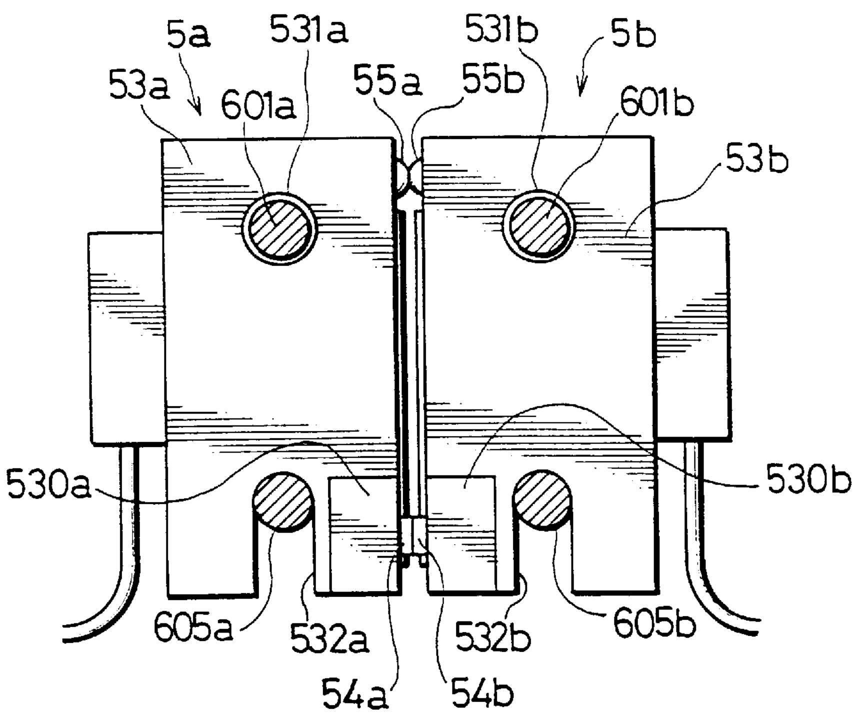
FIG. 19A is a front view showing printing head units of the second ink jet printing apparatus.
Figure 19B:
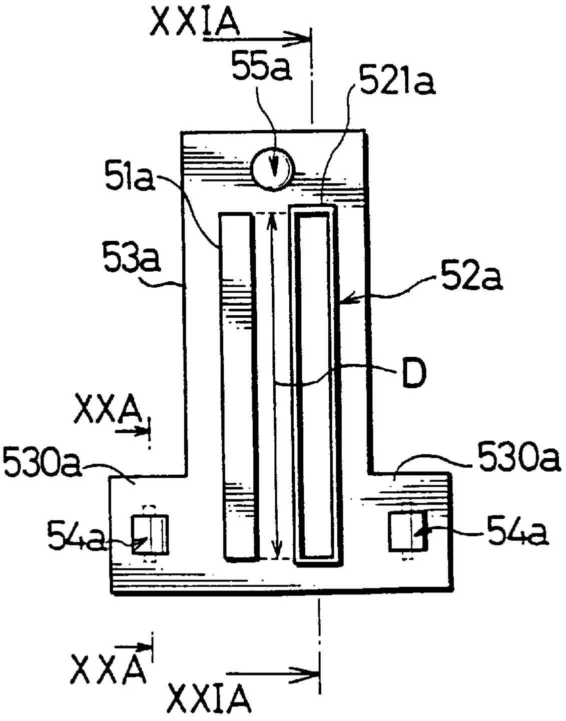
FIG. 19B is a right side view of the printing head unit disposed on a left side.
Figure 19C:
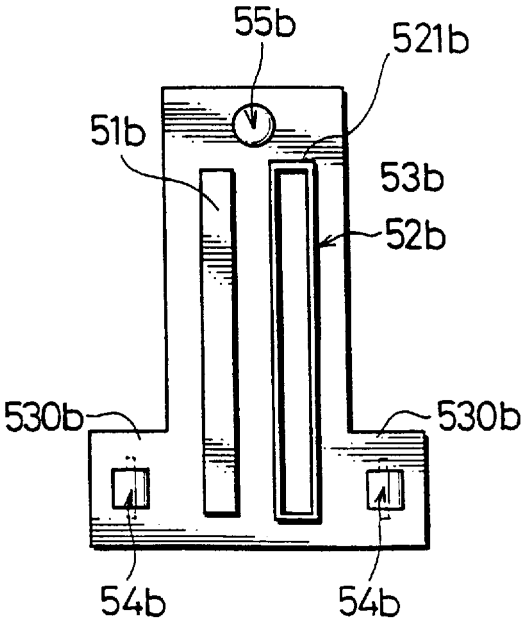
FIG. 19C is a left side view of the printing head unit disposed on a right side.

As shown in FIG. 18, the printing head units 5*a* and 5*b* are opposed to each other and are made simultaneously movable in the widthwise direction of the apparatus, namely, in a direction along which the support plates 42 are movable toward and away from each other. Thereby, one-line of an image can be printed simultaneously on both sides of a printing sheet P which is to be transported downward along the sheet transport path.

The printing head unit 5*a* (5*b*) includes a support block 53*a* (53*b*), an ink emission portion 51*a* (51*b*), and a capping portion 52*a* (52*b*). The ink emission portion 51*a* (51*b*) and the capping portion 52*a* (52*b*) each have a specified height D substantially corresponding to a width of one-line image.

In the state that the printing head units 5*a*, 5*b* are opposed to each other, the ink emission portion 51*a* opposes to the capping portion 52*b*, and the ink emission portion 51*b* opposes to the capping portion 52*a*. It should be appreciated that the home position of the printing head unit 5*a* (5*b*) is set, e.g., close to the front or rear transport belt 43 (44).

The ink emission portions 51*a* , 51*b* each includes a large number of minute nozzles which are arranged in the form of a matrix. Each nozzle is provided with a piezoelectric conversion element to control ink emission. Ink is emitted through each nozzle onto both sides of a printing sheet P simultaneously by an ink emitter provided in each nozzle to thereby print images on the both side of the printing sheet P. In this embodiment, ink of black color is emitted to print a monochromatic image, i.e., a black mono-chromatic image onto the printing sheet P.

By reciprocally moving the printing head units 5*a*, 5*b* in the widthwise direction of the apparatus and allowing the ink emission portions 52*a*, 52*b* to emit ink in the form of dots, one-line image printing having the width D is executed on a printing sheet P. It may be possible to adopt an arrangement of minute nozzles in a zigzag or in a line other than a matrix.

Ink is supplied to the printing head units 5*a*, 5*b* by way of an ink supply tube 15 from an ink supply portion 14 shown in FIG. 17. As shown in FIG. 17, the ink supply portion 14 is arranged at an appropriate position in a lower portion of the printing portion 4 in the main body of the ink jet printing apparatus. The ink supply portion 14 includes an ink cartridge containing ink of black color. The ink supply tube 15 has a needle member at an upstream end, and is connected with the ink supply portion 14 by inserting the needle member into the ink supply portion 14. The ink supply tube 15 is made of, e.g., soft synthetic resin and has a length sufficient to follow the reciprocal movement of the printing head units 5*a*, 5*b*.

Next, a printing head unit moving mechanism will be described. In the printing head unit moving mechanism, the support block 53*a* is formed with front and rear through holes 531*a*, 532*a* at a specified position in an upper portion and a lower portion thereof, respectively. Likewise, the support block 53*b* is formed with front and rear through holes 531*b*, 532*b* at a specified position in an upper portion and a lower portion thereof, respectively.

A slide shaft 605*a* extending in the widthwise direction of the apparatus is supported on the main body of the ink jet printing apparatus, and is passed through the holes 532*a*. The support block 53*a* is slidable on the slide shaft 605*a*. Likewise, a support shaft 605*b* is supported on the main body of the ink jet printing apparatus, and is passed through the holes 532*b*. The support block 53*b* is slidable on the slide shaft 605*b*.

Also, a ball shaft 601*a* extending in the widthwise direction of the apparatus is rotatably supported on the apparatus main body, and is passed through the holes 531*a*. The holes 531*a* are internally threaded. The ball shaft 601*a* is externally threaded. Likewise, a ball shaft 601*b* is rotatably supported on the apparatus main body, and is passed through the holes 531*b*. The holes 531*b* are internally threaded. The ball shaft 601*b* is externally threaded. With this arrangement, when the ball shaft 601*a* (601*b*) is simultaneously rotated in a forward or reverse direction, the support block 53*a* (53*b*) is simultaneously movable in the widthwise direction of the apparatus.

A gear wheel 603*a* is fixedly secured to the ball shaft 601*a*. The gear wheel 603*a* is meshed with a gear wheel 604*a* connected to a head support block motor 602*a*. The head support block motor 602*a* is a stepping motor and adapted for rotating the ball shaft 601*a* by way of the gear wheels 603*a*, 604*a*. Likewise, a gear wheel 603*b* is fixedly secured to the ball shaft 601*b*. The gear wheel 603*b* is meshed with a gear wheel 604*b* connected to a head support block motor 602*b*. The head support block motor 602*b* is a stepping motor and adapted for rotating the ball shaft 601*b* by way of the gear wheels 603*b*, 604*b*.

The rotating amount of the ball shaft 601*a*, 601*b*, i.e., moving amount of the printing head units 5*a*, 5*b* is controlled by counting the number of drive pulses supplied to the printing head unit driving motors 602*a*, 602*b*.

In this embodiment, both of the motors 602*a*, 602*b* are used. However, either one of the printing head unit driving motors 602*a*, 602*b* may be used. In this case, a drive transmission mechanism may be provided to transmit rotating force of the gears 603*a*, 603*b* to thereby simultaneously move the printing head units 5*a*, 5*b*.

Next, a detailed construction of the printing head units 5*a*, 5*b* will be described with reference to FIGS. 19A to 20C.

The support block 53*a* (53*b*) is formed with front and rear shoulder portions 530*a* (530*b*) on front and rear sides of a lower portion thereof. The front and rear shoulder portions 530*a* (530*b*) is rotatably provided with contact rollers 54*a* (54*b*). Further, a contact ball 55*a* (55*b* ) is rotatably provided in a center of an upper right (left) surface of the support block 53*a* (53*b*).

The contact ball 55*a* faces the contact ball 55*b*, and the front and rear contact rollers 54*a* face the front and rear contact rollers 54*b*. The contact balls 55*a* and 55*b*, and the contact rollers 54*a* and 54*b* serve to hold a printing sheet P while to keep a specified distance between a surface of the ink emission portions 51*a* , 51*b* and the printing sheet P.

The front (rear) shoulder portion of the support block 53*a* is formed with a chamber 535*a* for accommodating the front (rear) contact roller 54*a* therein. The chamber 535*a* has a shape of parallelepipeds. A lowermost wall of the chamber 535*a* is slightly higher than that of the ink emission portion 51*a* . The shoulder portion is further formed with an opening which is defined by an upper and lower restricting walls 543*a*. A plate spring 540*a* is provided on the upper and lower restricting walls 543*a*. The plate spring 540*a* includes a base portion 541*a* fixedly attached to an inner wall of the chamber 535*a*, and a pushing portion 542*a*. A solenoid 550*a*, a spring 537*a*, and a pushing member 538*a* made of magnetic material are located in the chamber 535*a*. The solenoid 550*a* is fixedly attached to an inner wall of the chamber 535*a*. The spring 537*a* is mounted on a lead end of the solenoid 550*a*.

A specified portion of the contact roller 54*a* projects from the chamber 535*a* while being pushed by the pushing member 538*a* which is urged by the spring 537*a* when the solenoid 550*a* is turned off. In this state, the contact roller 54*a* is restricted from projecting further owing to the fact that bosses of the contact roller 54*a* come into contact with the upper and lower restricting walls 543*a*. The pushing member 538*a* is formed with a generally C-shaped curved portion on a lead end thereof so that the contact roller 54*a* can be stably placed inside the curved C-shaped portion of the pushing member 538*a* when the solenoid 550*a* is turned off. On the contrary, when the solenoid 550*a* is turned on, the solenoid 550*a* electrically attracts the pushing member 538*a*, and together with the attracting movement of the pushing member 538*a* toward the solenoid 550*a*, the contact roller 54*a* is urged inward by the pushing portion 542*a* of the spring 540*a* to thereby retract the contact roller 54*a* inside the chamber 535*a*. The pushing member 538*a* is arranged with a pair of roller bearings 539*a* at a specified position on an outer surface thereof in such a manner that a specified portion of the bearing 539*a* projects outside from the pushing member 538*a* to thereby make the contact roller 54*a* freely rotatable.

Since an arrangement of the contact roller 54*b* is identical to the arrangement of the contact roller 54*a*, a description of an arrangement of the contact roller 54*b* is omitted.

Figure 20A:
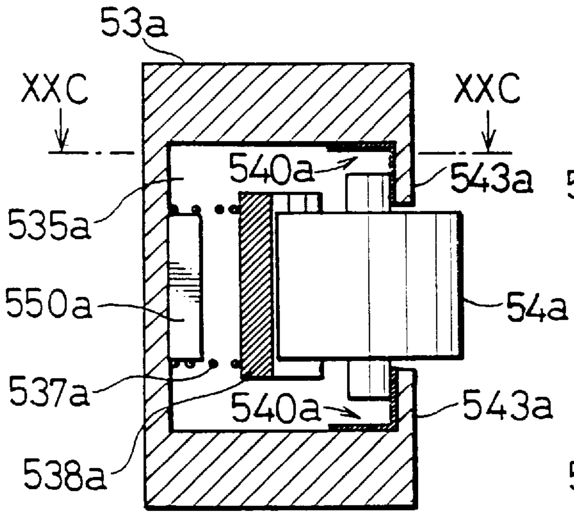
FIG. 20A is a sectional view taken along the line XXB—XXB in FIG. 19B, showing a contact roller of the printing head unit being in a projected state.
Figure 20B:
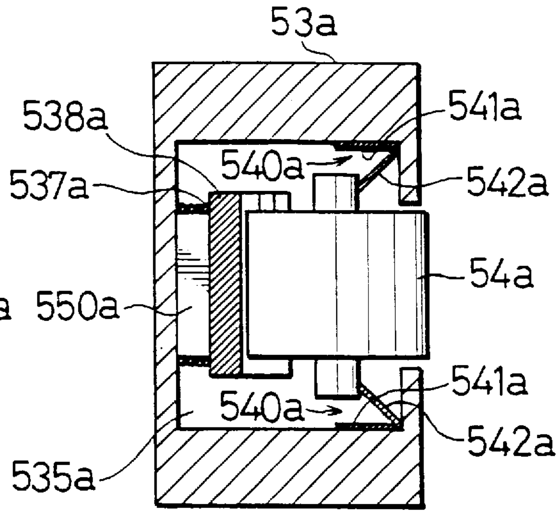
FIG. 20B is a sectional view showing the contact roller in a retracted state.
Figure 20C:
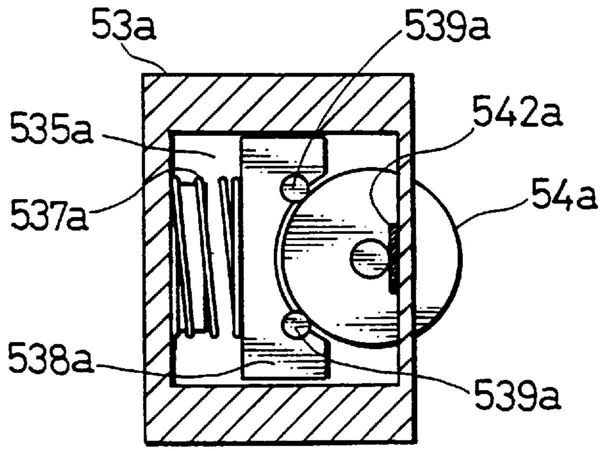
FIG. 20C is a sectional view taken along the line XXC—XXC in FIG. 20A.

With this arrangement, when the solenoid 550*a* is turned off, the pushing member 538*a* is pushed by the spring 537*a* against the pushing portion 542*a* of the plate spring 540*a* to thereby project the specified portion of the contact roller 54*a* from a lead end surface of the printing head unit 5*a* as shown in FIG. 20A. Likewise, when a solenoid 550*b* is turned off, a pushing member 538*b* is pushed by the spring 537*b* against the pushing portion 542*b* of a plate spring 540*b* to thereby project a specified portion of the contact roller 54*b* from a lead end surface of the printing head unit 5*b*.

On the contrary, when the solenoid 550*a* is turned on, together with the retracted movement of the pushing member 538*a* being attracted to the electrically energized solenoid 550*a* against the spring 537*a*, the contact roller 54*a* is retracted inside the chamber 535*a* by the pushing portion 542*a*. Consequently, the contact roller 54*a* changes its position from a projected state in FIG. 20A to a retracted state in FIG. 20B. Likewise, when the solenoid 550*b* is turned on, together with a retracted movement of the pushing member 538*b* being attracted to the electrically energized solenoid 550*b* against the spring 537*b* , the contact roller 54*b* is retracted inside the chamber 535*b* by the pushing portion 542*b*, thereby changing its position from a projected state to a retracted state.

When the printing is instructed and the printing head units 5*a* and 5*b* are moved in the widthwise direction of the apparatus, e.g., from front to rear, the rear contact rollers 54*a* and 54*b* are brought into the projected state, while the front contact rollers 54*a* and 54*b* are brought into the retracted state. The ink emission portions 51*a* and 51*b* perform a one-line image printing onto both sides of a printing sheet P, while the printing sheet P can be reliably held by the rear contact rollers 54*a* and 54*b* and the specified distance defined by the projected rear contact rollers 54*a* and 54*b* can be kept between the printing sheet P and the surface of the ink emission portions 51*a* and 51*b*.

Further, since the front rollers 54*a* and 54*b* are in the retracted state, the both sides of the printing sheet P having the one-line ink image being printed are not brought into contact with the retracted contact rollers. Thereby, the both sides of the printing sheet P can be prevented from being smeared with the ink image.

Subsequently, when the printing head units 5*a* and 5*b* are moved in a reverse direction from rear to front, the rear contact rollers 54*a* and 54*b* are brought into a retracted state, and the front contact rollers 54*a* and 54*b* are brought into a projected state and reliably hold the printing sheet P while keeping the distance between the printing sheet P and the surface of the ink emission portions 51*a* and 51*b* constant. Thus, a next one-line image printing can be executed on the both sides of the printing sheet P.

The contact balls 55*a*, 55*b* are rollably fixed to a side wall of the chamber formed in the support blocks 53*a*, 53*b* and arranged in such a manner as to project a specified distance from the lead end wall of the support blocks 53*a*, 53*b*.

Accordingly, when the printing head units 5*a*, 5*b* are reciprocally moved, the project portions of the contact balls 55*a*, 55*b* are brought into contact with the printing sheet P while keeping the distance between the printing sheet P and support blocks 53*a*, 53*b* constant, and the printing head units 5*a*, 5*b* are smoothly moved on the printing sheet P.

It should be noted that there is a clearance between the contact rollers 54*a* and 54*b* in a projected state and between the contact balls 55*a* and 55*b* to smoothly transport the printing sheet P downward.

Figure 21A:
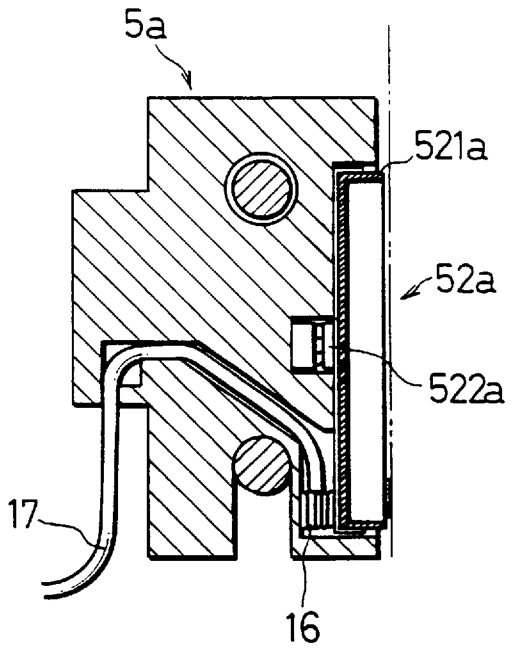
FIG. 21A is a sectional view taken along the line XXIA—XXIA in FIG. 19B, showing a capping portion of the printing head unit being retracted to enable printing operation.
Figure 21B:
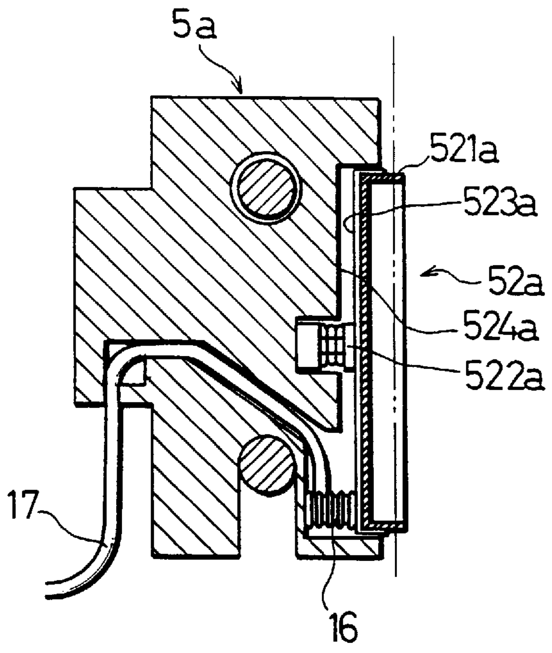
FIG. 21B is a sectional view showing the capping portion being projected to enclose an ink emission portion of the opposite printing head unit.

An arrangement of the capping portions 52*a*, 52*b* will be described with reference to FIGS. 21A and 21B. FIG. 21A shows a retracted state of the capping portion 52*a*, and FIG. 21B shows a projected state of the capping portion 52*a*. Phantom lines in FIGS. 21A and 21B show a center line between the printing head units 5*a* and 5*b*.

As mentioned above, the capping portion 52*a* faces the ink emission portion 51*b*, and the capping portion 52*b* faces the ink emission portion 51*a* . The capping portion 52*a* includes a cap 521*a* and a solenoid 522*a*. Likewise, the capping portion 52*b* includes a cap 521*b* and a solenoid 522*b*.

The cap 521*a* is made of rubber or soft synthetic resin, and fixedly attached to a base member 523*a* made of metal or hard synthetic resin. The base member 523*a* is provided in a recessed portion 524*a* which is formed at an appropriate position in the support block 53*a*. The recessed portion 524*a* is formed with a small cave in a middle portion thereof. A stationary portion of the solenoid 522*a* is placed in the small cave while a moving portion of the solenoid 522*a* is fixedly attached on the base member. A spring is provided between the stationary portion and the moving portion of the solenoid 522*a*.

When the solenoid 522*a* is energized, the moving member is electrically attracted to the stationary portion of the solenoid 522*a* against the spring to thereby retract the cap 521*a* from the ink emission portion 51*b*. When the solenoid 522*a* is deenergized, the spring urges the moving portion of the solenoid 522*a* together with the base member 523*a* outward to thereby project the cap 521*a* from the recessed portion 524*a* by a specified amount.

When the printing is instructed, the solenoid 522*a* is energized to bring the cap 521*a* in a retracted state where the cap 521*a* is retracted from the center line as shown in FIG. 21A. On the contrary, when no printing is executed, the solenoid 522*a* is deenergized, and the cap 521*a* is brought into a projected state as shown in FIG. 21B, to thereby enclose the ink emission portion 51*b* by the capping portion 52*a*. The capping portion 52*a* in the projected state can prevent ink at a lead end of the nozzles from solidifying and foreign matters and bubbles from entering in the nozzles.

The cap 521*a* and the base member 523*a* are formed with a small hole at an appropriate position in their respective lower portions. A drainage tube 16 is communicated with an inside of the cap 521*a* by way of the small holes. Further, a waste ink tube 17 is connected to the drainage tube 16. The drainage tube 16 has a form of bellows and is made contractible and expandable in accordance with turning on and off of the solenoid 522*a*.

A pump 103 is connected to the waste ink tube 17. When the capping portions 52*a*, 52*b* enclose the ink emission portions 51*b*, 51*a*, respectively, the pump 103 is operated to generate a suction force. The pump 103 is operated to reduce the ink pressure or give a pressure and to maintain a specified ink emission condition. Waste ink in the cap 521*a* is drawn by the pump 103 through the waste ink tube 17, and is then introduced to a waste ink tank 18. The waste ink is absorbed by an absorptive member made of urethane foam which is provided in the waste ink tank 18.

In this embodiment, after the printing is instructed, the feeding of printing sheet in the printing portion 4 is suspended by a specified interval, and the printing head units 5*a* and 5*b* are temporarily returned to the home position to thereby render the ink emission portions 51*a* and 51*b* perform the home position ink emission in the state of the capping portions 52*b*, 52*a* enclosing the ink emission portions 51*a* , 51*b*. However, the home position ink emission may be performed in the state of the capping portion 52*b*, 52*a* not enclosing the ink emission portions 51*a* , 51*b*.

Figure 22:
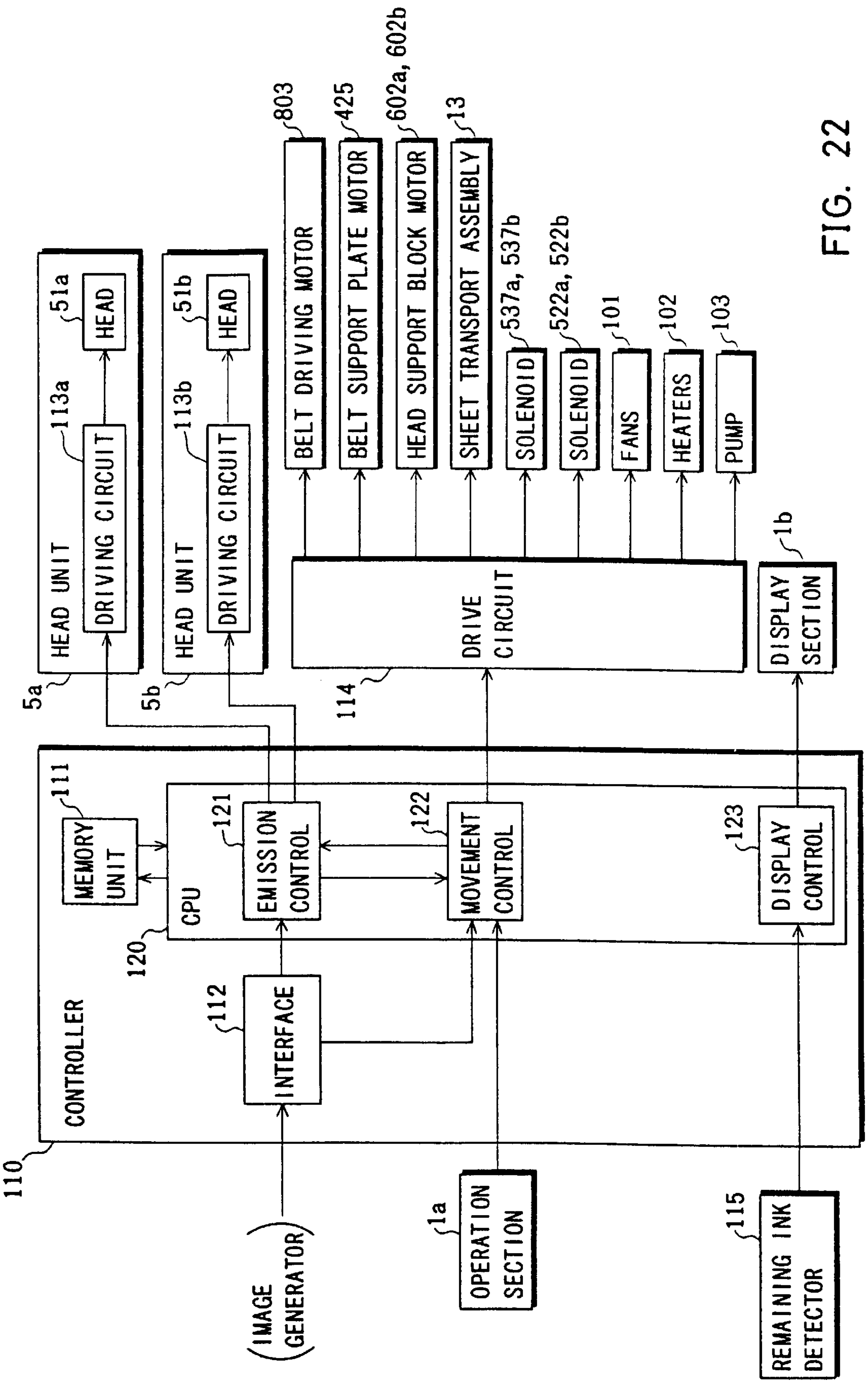
FIG. 22 is a block diagram showing a control system of the second ink jet printing apparatus.

A control system of the second ink jet printing apparatus will be described with reference to FIG. 22. It should be appreciated that elements identical to those in the first ink jet printing apparatus will be shown at the same reference numerals and only operations different from the first ink jet printing apparatus will be described.

A movement control portion 122 supplies a drive pulse to the printing head unit driving motors 602*a* and 602*b* via a drive circuit 114 to control the reciprocal movement of the support blocks 53*a*, 53*b*, namely, the printing head units 5*a*, 5*b*. The printing head units 5*a* and 5*b* are synchronously moved in such a manner that the printing head unit 5*a* faces the printing head unit 5*b*. The moving speed of the printing head units 5*a*, 5*b* are set in such a manner that the moving speed cannot be increased beyond a particular speed to keep the fluctuation of pressure in the ink supply tube 15 within a specified limit. The movement control portion 122 controls the dryers 10 to keep fans 101 and heaters 102 in an ON state from a time at which printing is started onto a first printing sheet P1 to a time at which a last printing sheet Pn having an ink image has passed through the dryers 10 and been discharged outside the apparatus by the discharge roller pair 6.

The ink emission control portion 121 controls the printing head units 5*a*, 5*b* so that when the printing head units 5*a* and 5*b* are simultaneously moved from rear to front, an ink emission signal is supplied to the ink emission portion 51*b* in a direction opposite to the moving direction of the printing head units 5*a*, 5*b*, namely, in a direction from front to rear, while an ink emission signal is supplied to the ink emission portion 51*a* in a direction identical to the moving direction of the printing head units 5*a*, 5*b*, namely, from rear to front.

On the other hand, when the printing head units 5*a* and 5*b* are simultaneously moved from front to rear, the ink emission control portion 121 controls the printing head units 5*a*, 5*b* so that an ink emission signal is supplied to the ink emission portion 51*b* in a direction identical to the moving direction of the printing head units 5*a*, 5*b*, while the ink emission signal is supplied to the ink emission portion 51*a* in a direction opposite to the moving direction of the printing head units 5*a*, 5*b*. Consequently, an image can be constantly printed from a lead end of one line on both sides of a printing sheet.

Further, the ink emission period controlled by the ink emission control portion 121, namely, the period of outputting an ink emission signal to the piezoelectric conversion element is set in accordance with the moving speed of the printing head units 5*a*, 5*b*.

The ink emission portions 52*a*, 52*b* are made to emit ink simultaneously onto both sides of a printing sheet P while the printing head units 5*a* and 5*b* are synchronously moved in the same direction reciprocally. Accordingly, one-line image can be printed simultaneously on the both sides of printing sheet P. The time required for printing can be reduced.

In this embodiment, both of the ink emission portions 51*a* and 51*b* emit ink while the printing head units 5*a* and 5*b* are moved in the same direction simultaneously. However, one of the ink emission portions may emit ink, while rendering both the printing head units move in the same direction simultaneously. Specifically, when the printing head units 5*a* and 5*b* are moved from rear to front, only the ink emission portion 51*a* in the printing head unit 5*a* may emit ink.

On the contrary, when the printing head units 5*a* and 5*b* are moved from front to rear, only the ink emission portion 51*b* in the printing head unit 5*b* may emit ink. In this case, an image can be always printed from a lead end of one line. Accordingly, there is no necessity of controlling an ink emission signal so that one of the printing head units may be supplied with the ink emission signal in a reverse direction.

Further, the home position of the printing head units 5*a* and 5*b* may be set in a position opposite to each other. For example, the printing head unit 5*a* may be placed close to the front belt support plate 42 of the printing portion 4 as the home position, and the printing head unit 5*b* may be placed close to the rear belt support plate 42 as the home position, or vice versa. In this way, the printing head units 5*a* and 5*b* start moving from the respective home positions and come across with each other substantially in a middle part of a printing sheet.

Figure 23:
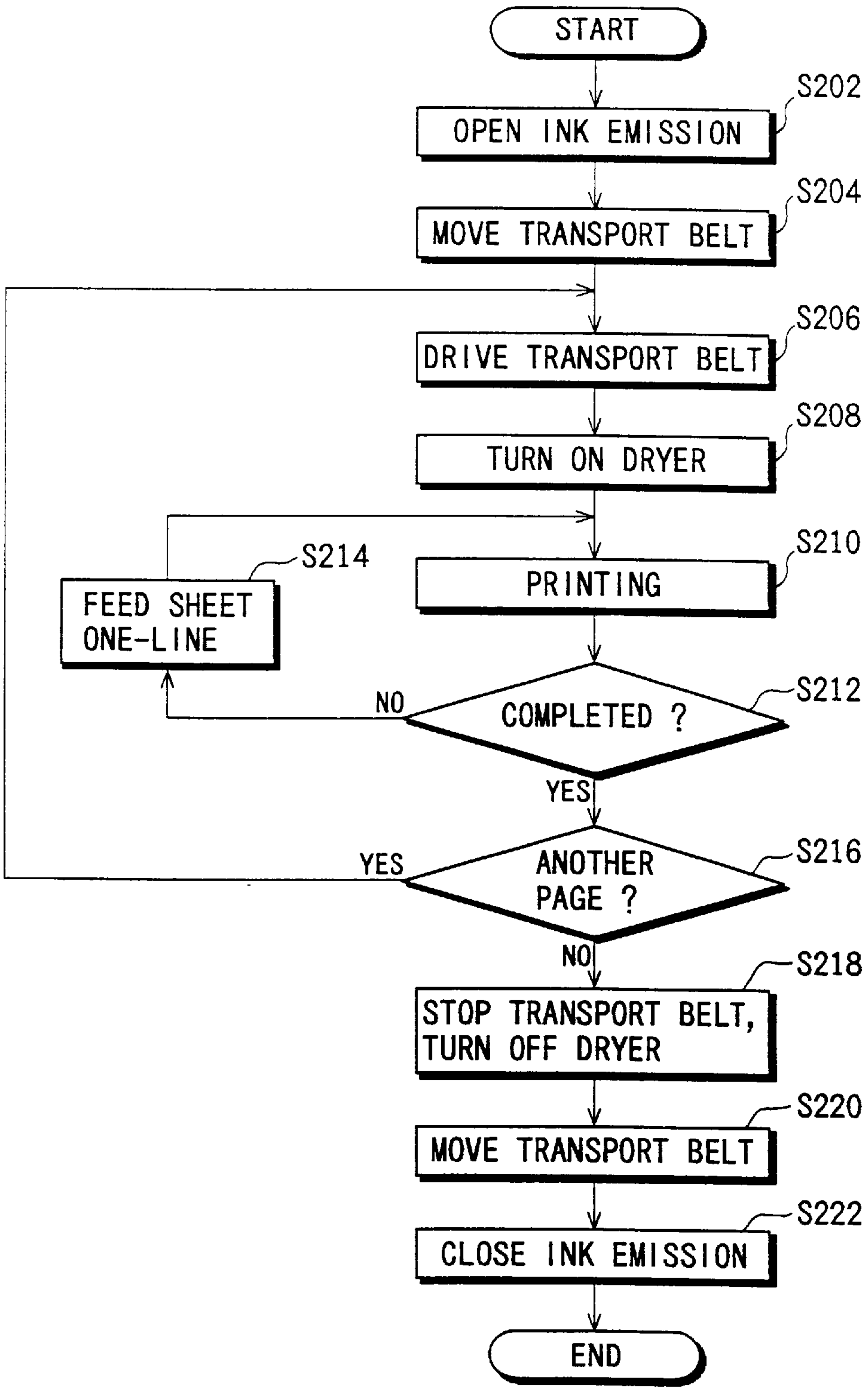
FIG. 23 is a flowchart showing a main routine of printing operation of the second ink jet printing apparatus.

Next, printing operation of the second ink jet printing apparatus will be described with reference to a flowchart in FIG. 23.

When the solenoids 522*a* , 522*b* are turned on, the cap 521*a* , 521*b* are brought into a retracted state to thereby open the ink emission portions 51*b*, 51*a* in Step S202. Subsequently, the belt support plates 42 are selectively moved to a specified position in the widthwise direction of the apparatus to move the transport belts 43, 44 in a specified position in accordance with an inputted sheet size in Step S204.

Next, the corresponding feed roller in the sheet transport assembly 13 is rotated to dispense a printing sheet P having the inputted size from a specified cassette. Then, when a lead end of the printing sheet P has reached the registration roller pair 38 and reliably been nipped between the registration roller pair 38 after forming a specified bulge portion, the driving of the printing sheet transport assembly 13 is temporarily suspended. Subsequently, the drive roller of the registration roller pair 38 starts rotating to feed the printing sheet P downward in the printing portion 4, and the transport belts 43 start moving forward in Step S206. Then, the dryers 10 are turned on in Step S208.

Subsequently, the downward transport of the printing sheet P is temporarily suspended, and the ink emission portions 51*a* , 51*b* emit ink to perform a one-line image printing while rendering the printing head units 5*a* and 5*b* move in a first direction along the widthwise direction of the apparatus in Step S210. Then, in Step S212, it is judged whether or not a whole image printing is completed. If the whole image printing is not finished (NO in Step S212), the printing sheet P is fed downward by the specified distance D corresponding to one-line in Step S214. Then, while rendering the printing head units 5*a* and 5*b* move in a direction opposite to the first direction, the ink emission portions 51*a* and 51*b* emit ink to print a next one-line image in Step S210. These operations from Steps S210 to S212 are repeated. When it is judged that the whole image printing is finished (YES in Step S212). it is judged in Step S216 whether or not there remains image data of another page.

If it is judged that there remains the image data (YES in Step S216). the routine returns to Step S206. On the other hand, if it is judged that no image data exists (NO in Step S216), the driving of the transport belts 43 is stopped, and the dryers 10 are turned off in Step S218. The belt support plates 42 are moved to the home position to thereby move the transport belts 43, 44 to the home position in Step S220. Subsequently, the solenoids 522*a*, 522*b* are turned off to bring the capping portions 52*a*, 52*b* into a projected state, thereby enclosing the ink emission portions 51*b*, 51*a* by the capping portions 52*a*, 52*b*, respectively in Step S222.

As mentioned above, according to the second ink jet printing apparatus, the transport belts 43, 44 are selectively movable in the widthwise direction of the apparatus in accordance with the widthwise size of a printing sheet. A printing sheet can be transported along the transport path defined by the transport of the belts 43, 44, while both front and rear ends of the sheet being nipped by the belts 43, 44. Accordingly, printing sheets of various sizes can be reliably transported along the transport path, and an image can be printed on both sides of the printing sheets simultaneously by the printing head units 5*a*, 5*b*.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet; and a moving mechanism for moving the first and second printing head units to and from said vertical plane between a first state at positions apart from one another and a second state at positions proximate one another.

2. The ink jet printing apparatus according to claim 1 wherein said moving mechanism moves the first and second printing head units in a horizontal direction perpendicular to said vertical plane between said first state at said positions apart from one another to said second state at said positions proximate one another while maintaining a horizontal orientation of ink jets of said first and second printing head units.

3. The ink jet printing apparatus according to claim 1 wherein at least one of said first and second printing head units has a capping portion for capping said ink emission portion of another one of said first and second printing head units, said capping portion being in engageable alignment with said ink emission portion of said another one of said first and second printing head units such that said capping portion engages and seals said ink emission portion of said another one of said first and second printing head units when said first and second printing head units are in said second state.

4. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet;

a moving mechanism for moving the first and second printing head units to and from said vertical plane between a first state at positions apart from one another and a second state at positions proximate one another; and the first and second printing head units each having a capping portion for capping the ink emission portions of the second and first printing head units, respectively, when the first and second printing head units are in the second state.

5. The ink jet printing apparatus as defined in claim 4, wherein the ink emission portions of the first and second printing head units each have a width along a horizontal direction parallel to said vertical plane equal to or more than a width of the printing sheet.

6. The ink jet printing apparatus as defined in claim 4, wherein the ink emission portions of said first and second printing head units each have a width along a horizontal direction parallel to said vertical plane smaller than a width of the printing sheet, and said ink jet printing apparatus further comprising a moving mechanism for moving the first and second printing head units in the horizontal direction parallel to said vertical plane so that the ink emission portions of said first and second printing head units are capable of printing across the printing sheet.

7. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet;

the first and second printing head units each having first and second spacing members disposed horizontally adjacent opposing sides of said ink emission portions of said first and second printing head units for keeping a constant space between the ink emission portion and a respective one of said first and second side surfaces of the printing sheet;

means for moving each of said first and second printing head units in first and second horizontal directions, respectively, for printing on said first and second side surfaces of said printing sheet; and said first and second printing head units each having retraction mechanisms for selectively retracting said first and second spacing members from contacting said printing sheet in accordance with a respective movement in one of said first and second horizontal direction such that for each of said first and second printing head units a respective one of said first and second spacer members trailing said ink emission portion is retracted from contacting said printing sheet so as not to disturb ink emitted on said printing sheet.

8. The ink jet printing apparatus according to claim 7 further comprising said first and second printing head units having a third spacing member for spacing said printing sheet a predetermined distance from said ink emission portions, said third spacing member being proximate one of top and bottom ends of said ink emission portions of said first and second printing head units and said first and second spacing members being proximate another one of said top and bottom ends of said ink emission portions of said first and second printing head units.

9. The ink jet printing apparatus according to claim 8 wherein corresponding ones of said first, second and third spacing members are aligned opposite each other with said printing sheet passing between said corresponding ones of said first, second and third spacing members.

10. The ink jet printing apparatus according to claim 8 wherein said first, second and third spacing members include at least one of balls and rollers rotatably mounted in said printing head units.

11. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet;

the first and second printing head units each having first and second spacing members disposed horizontally adjacent opposing sides of said ink emission portions of said first and second printing head units for keeping a constant space between the ink emission portion and a respective one of said first and second side surfaces of the printing sheet;

means for moving each of said first and second printing head units in first and second horizontal directions, respectively, for printing on said first and second side surfaces of said printing sheet;

said first and second printing head units each having retraction mechanisms for selectively retracting said first and second spacing members from contacting said printing sheet in accordance with a respective movement in one of said first and second horizontal direction such that for each of said first and second printing head units a respective one of said first and second spacer members trailing said ink emission portion is retracted from contacting said printing sheet so as not to disturb ink emitted on said printing sheet; and the first and second spacing members on each of said first and second printing head units being a roller rotatably attached thereto.

12. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet; and the sheet transporting mechanism including:

a first pair of endless belts for holding the printing sheet therebetween by engaging first opposing vertical side edge portions of said first and second side surfaces whereat printing is not effected by said first and second printing head units, the first pair of endless belts being rotatable in a vertical direction;

a second pair of endless belts for holding the printing sheet therebetween by engaging second opposing vertical side edge portions of said first and second side surfaces whereat printing is not effected by said first and second printing head units, the second pair of endless belts being rotatable in the same vertical direction as the first pair of endless belts;

the first opposing vertical side edge portions being on a horizontally opposite side of said printing sheet from said second opposing vertical side edge portions; and a driver for rotating the first and second pairs of endless belts in synchronism with each other.

13. The ink jet printing apparatus according to claim 12 wherein said first and second opposing vertical side edge portions of said first and second side surfaces define printing areas therebetween on said first and second side surface whereat printing is effected and said first and second opposing vertical side edge portions of said first and second side surfaces occupy areas of said printing sheet defining non-printing portions of said first and second side surfaces whereat printing is not effected.

14. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet; and the sheet transporting mechanism including:

a first pair of endless belts for holding the printing sheet therebetween by engaging first opposing vertical side edge portions of said first and second side surfaces whereat printing is not effected by said first and second printing head units, the first pair of endless belts being rotatable in a vertical direction;

a second pair of endless belts for holding the printing sheet therebetween by engaging second opposing vertical side edge portions of said first and second side surfaces whereat printing is not effected by said first and second printing head units, the endless belts being rotatable in the same vertical direction as the first pair of endless belts;

the first opposing vertical side edge portions being on a horizontally opposite side of said printing sheet from said second opposing vertical side edge portions;

a driver for rotating the first and second pairs of endless belts in synchronism with each other; and the sheet transporting mechanism including a belt moving mechanism for moving the first and second pairs of endless belts to and from one another in accordance with a width of the printing sheet.

15. An ink jet printing apparatus for printing on first and second side surfaces of a printing sheet, comprising:

a sheet transporting mechanism for vertically transporting the printing sheet along a vertical plane;

a first printing head unit disposed adjacent a first side of the vertical plane and having an ink emission portion for emitting ink onto the first side surface of the printing sheet;

a second printing head unit disposed adjacent a second side of the vertical plane and horizontally opposite said first printing head unit, the second printing head unit having an ink emission portion for emitting ink onto the second side surface of the printing sheet;

a moving mechanism for moving the first and second printing head units to and from said vertical plane between a first state at positions apart from one another and a second state at positions proximate one another; and the sheet transporting mechanism includes a belt moving mechanism for moving at least one of the first and second pairs of endless belts to and from another one of said first and second pairs of endless belts in accordance with a width of the printing sheet.

* * * * *